US007707506B2

(12) United States Patent
Weigel et al.

(10) Patent No.: US 7,707,506 B2
(45) Date of Patent: Apr. 27, 2010

(54) BREADCRUMB WITH ALTERNATIVE RESTRICTION TRAVERSAL

(75) Inventors: Achim Weigel, Bad Durkheim (DE); Darin Krasle, Keampfelbach (DE); Hans-Juergen Richstein, Rauenberg (DE)

(73) Assignee: SAP AG, Walldorf (DE)

( * ) Notice: Subject to any disclaimer, the term of this patent is extended or adjusted under 35 U.S.C. 154(b) by 521 days.

(21) Appl. No.: 11/321,270

(22) Filed: Dec. 28, 2005

(65) Prior Publication Data

US 2007/0156651 A1 Jul. 5, 2007

(51) Int. Cl.
*G06F 3/00* (2006.01)

(52) U.S. Cl. ....................... 715/738; 715/739; 715/828; 715/841; 715/853; 715/854

(58) Field of Classification Search ................. 715/853, 715/854, 855, 738, 739, 810, 828, 829, 841
See application file for complete search history.

(56) References Cited

U.S. PATENT DOCUMENTS

| | | | | |
|---|---|---|---|---|
| 5,924,090 | A * | 7/1999 | Krellenstein | 707/5 |
| 6,038,560 | A * | 3/2000 | Wical | 707/5 |
| 7,062,483 | B2 * | 6/2006 | Ferrari et al. | 707/3 |
| 7,254,582 | B2 * | 8/2007 | Song et al. | 707/102 |
| 2001/0044758 | A1 * | 11/2001 | Talib et al. | 705/27 |
| 2003/0115326 | A1 * | 6/2003 | Verma et al. | 709/225 |
| 2003/0197738 | A1 * | 10/2003 | Beit-Zuri et al. | 345/786 |
| 2005/0160107 | A1 * | 7/2005 | Liang | 707/100 |
| 2005/0216447 | A1 * | 9/2005 | Talib et al. | 707/3 |
| 2006/0026145 | A1 * | 2/2006 | Beringer et al. | 707/3 |
| 2006/0106847 | A1 * | 5/2006 | Eckardt et al. | 707/101 |
| 2006/0123361 | A1 * | 6/2006 | Sorin et al. | 715/854 |
| 2007/0048714 | A1 * | 3/2007 | Plastina et al. | 434/308 |

* cited by examiner

*Primary Examiner*—Ba Huynh
(74) *Attorney, Agent, or Firm*—Mintz, Levin, Cohn, Ferris, Glovsky and Popeo, P.C.

(57) ABSTRACT

A breadcrumb may be displayed which identifies at least two restrictions of a plurality of documents in a sequence. The breadcrumb may include a graphical user interface element associated with a selected one of the restrictions having at least one subsequent restriction in the sequence. Once this graphical user interface element is selected, at least one attribute and a numeric indication of a number of the documents responsive to each restriction prior to the selected restriction that contain the attribute and each restriction in the sequence subsequent to the selected restriction may be displayed.

20 Claims, 24 Drawing Sheets

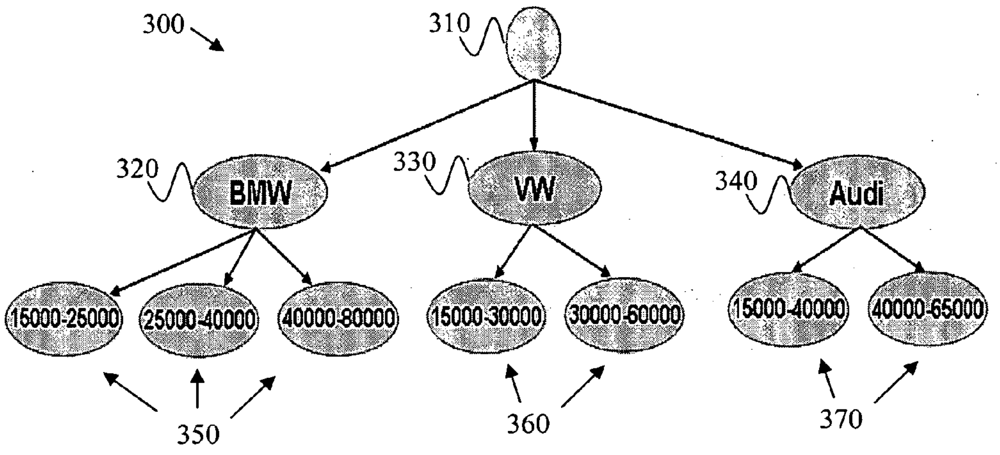

FIG. 3

```
<VIR_TAXONOMY>
<VIR_DEFINITIONS name="demo001" type="guidedNav" maxNumOfFolderDocs="10" guidedNavStrategy="fullAttributeExpansion"
docSeparationNumber="100"
 fixedOrderLevels="3" separationFolderName="Separate: "/>

<VIR_INDEX name="a42_v12"/>
<VIR_INDEX name="a42_v13"/>

<VIR_ATTR namespace="http://sapportals.com/xmlns/cm" name="modified" type="proposeRanges" displayName = "Modified: " />

<VIR_QUERY name="Countries">
<VIR_QUERY_RID name = "Germany" rid="/taxonomies/aw_a42_virTaxHelper1/Countries/Germany"/>
<VIR_QUERY_RID name = "France" rid="/taxonomies/aw_a42_virTaxHelper1/Countries/France"/>
<VIR_QUERY_RID name = "Spain" rid="/taxonomies/aw_a42_virTaxHelper1/Countries/Spain"/>
</VIR_QUERY>

<VIR_ATTR namespace="http://sapportals.com/xmlns/cm" name="folderNameForIndexing" type="allValues"  displayName = " "/>

</VIR_TAXONOMY>
```

Taxonomies

| Name | Documents | Documents Size | Rating | Modified |
|---|---|---|---|---|
| a42_v12 | | | | 15.03.05 10:48:29 |
| a42_v13 | | | | 15.03.05 11:28:23 |
| aw_a42_virTaxHelper1 | | | | 28.02.05 12:55:40 |
| aw_p06_large | | | | 24.02.05 16:28:56 |
| aw_p06_test2 | | | | 29.03.05 11:46:08 |
| Virtual_Taxonomies | | | | 16.03.05 15:15:30 |

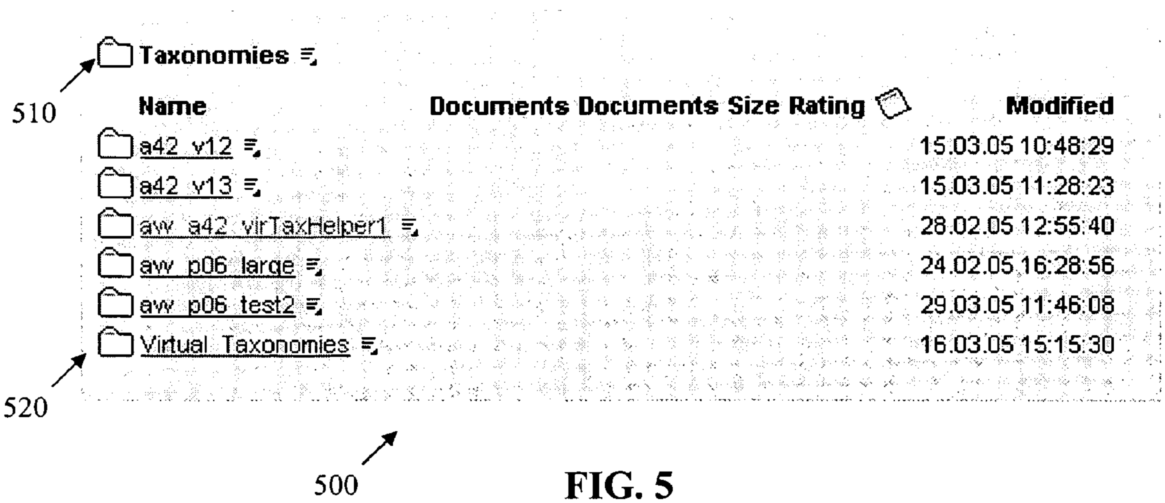

FIG. 5

Taxonomies > Virtual_Taxonomies

| Name | Documents | Documents Size | Rating | Modified |
|---|---|---|---|---|
| demo001 | | | | 14.03.05 13:00:49 |
| demo002 | | | | 14.03.05 12:58:34 |
| demo003 | | | | 15.03.05 12:06:24 |

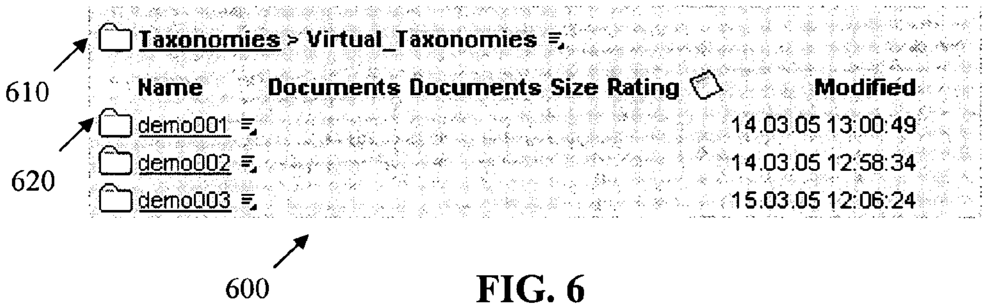

FIG. 6

Taxonomies > Virtual_Taxo... > demo001

| Name | Documents | Documents Size | Rating | Modified |
|---|---|---|---|---|
| Modified: 1996 | * | | | 1 |
| Modified: 1997 | * | | | 4 |
| Modified: 1998 | *** | | | 19 |
| Modified: 1999 | *** | | | 36 |
| Modified: 2000 | ***** | | | 209 |
| Modified: 2001 | ******** | | | 5919 |
| Modified: 2002 | ****** | | | 705 |
| Modified: 2003 | ***** | | | 189 |
| Modified: 2004 | ** | | | 7 |
| Modified: 2005 | ** | | | 6 |
| Modified: 2099 | * | | | 1 |

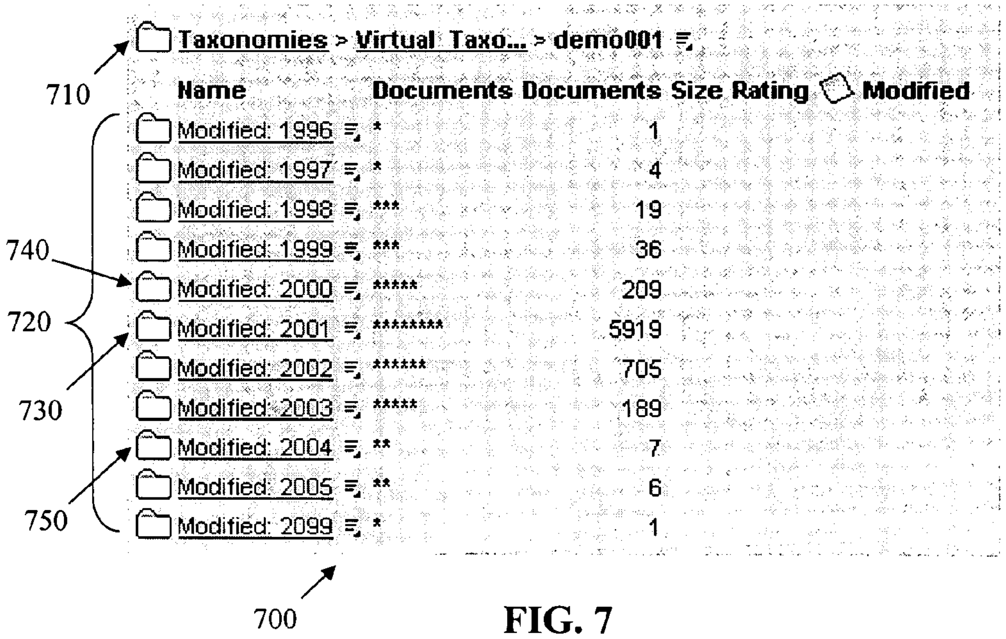

FIG. 7

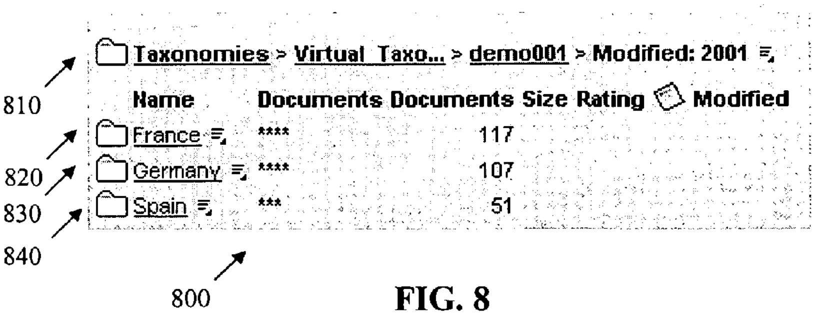

FIG. 8

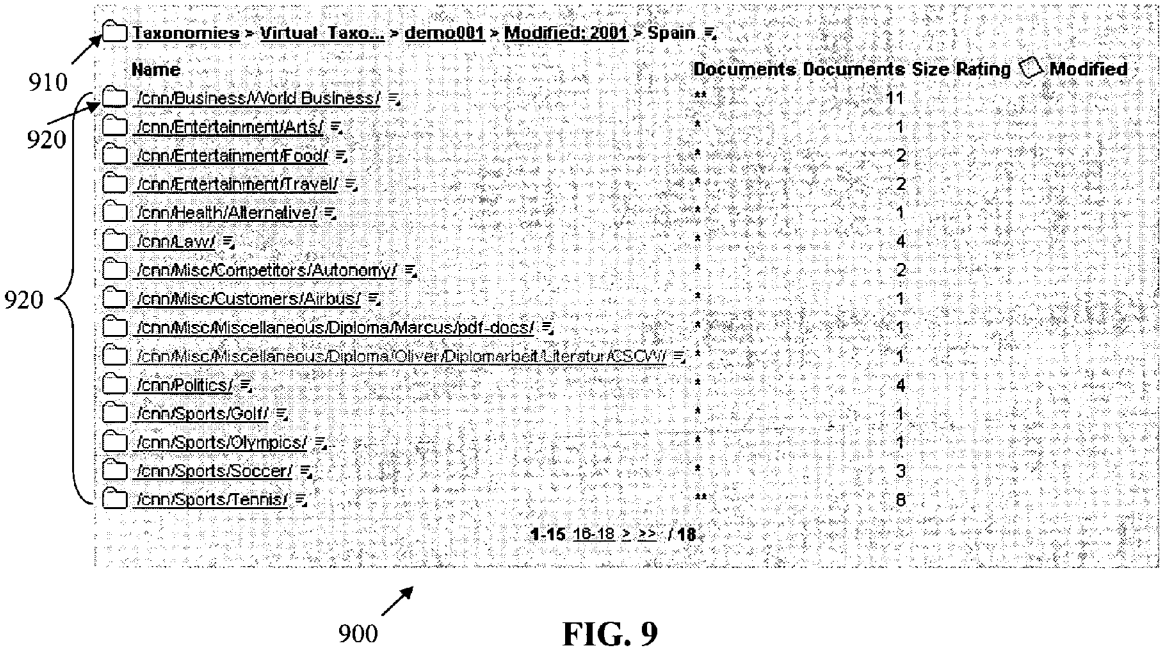

FIG. 9

```
        ┌─ Taxonomies > Virtual Taxo... > demo001 > Modified: 2001
  810   Name        Documents Documents Size Rating  Modified
        ┌─ France       ****                117
  820   ┌─ Germany      ****                107
  830   ┌─ Spain        ***                  51
  840
                   800         FIG. 8
```

```
        Taxonomies > Virtual Taxo... > demo001 > Modified: 2001 > Spain
  910   Name                                              Documents Documents Size Rating  Modified
        ┌─ /cnn/Business/World Business/                     **                 11
  920   ┌─ /cnn/Entertainment/Arts/                           *                  1
        ┌─ /cnn/Entertainment/Food/                           *                  2
        ┌─ /cnn/Entertainment/Travel/                         *                  2
        ┌─ /cnn/Health/Alternative/                           *                  1
        ┌─ /cnn/Law/                                          *                  4
        ┌─ /cnn/Misc/Competitors/Autonomy/                    *                  2
  920 ⎰ ┌─ /cnn/Misc/Customers/Airbus/                        *                  1
        ┌─ /cnn/Misc/Miscellaneous/Diploma/Marcus/pdf-docs/   *                  1
        ┌─ /cnn/Misc/Miscellaneous/Diploma/Oliver/Diplomarbeit/Literatur/CSCW/ *  1
        ┌─ /cnn/Politics/                                     *                  4
        ┌─ /cnn/Sports/Golf/                                  *                  1
        ┌─ /cnn/Sports/Olympics/                              *                  1
        ┌─ /cnn/Sports/Soccer/                                *                  3
        ┌─ /cnn/Sports/Tennis/                                **                 8
                           1-15 16-18 > >> / 18
                   900         FIG. 9
```

```
<VIR_TAXONOMY>
<VIR_DEFINITIONS name="demo002" type="guidedNav" maxNumOfFolderDocs="10" guidedNavStrategy="fullAttributeExpansion"
docSeparationNumber="100"/>

<VIR_INDEX name="a42_v12"/>
<VIR_INDEX name="a42_v13"/>

<VIR_ATTR namespace="http://sapportals.com/xmlns/cm" name="modified" type="proposeRanges" displayName = "Modified" />

<VIR_ATTR namespace="http://sapportals.com/xmlns/cm" name="folderNameForIndexing" type="allValues"
displayName = "Folder" />

<VIR_QUERY name="Topics">
<VIR_QUERY_RID name = "Test" rid="/taxonomies/aw_a42_virTaxHelper1/Topics/Test"/>
<VIR_QUERY_RID name = "System" rid="/taxonomies/aw_a42_virTaxHelper1/Topics/System"/>
<VIR_QUERY_RID name = "Work" rid="/taxonomies/aw_a42_virTaxHelper1/Topics/Work"/>
</VIR_QUERY>

<VIR_QUERY name="Countries">
<VIR_QUERY_RID name = "Germany" rid="/taxonomies/aw_a42_virTaxHelper1/Countries/Germany"/>
<VIR_QUERY_RID name = "France" rid="/taxonomies/aw_a42_virTaxHelper1/Countries/France"/>
<VIR_QUERY_RID name = "Spain" rid="/taxonomies/aw_a42_virTaxHelper1/Countries/Spain"/>
</VIR_QUERY>

</VIR_TAXONOMY>
```

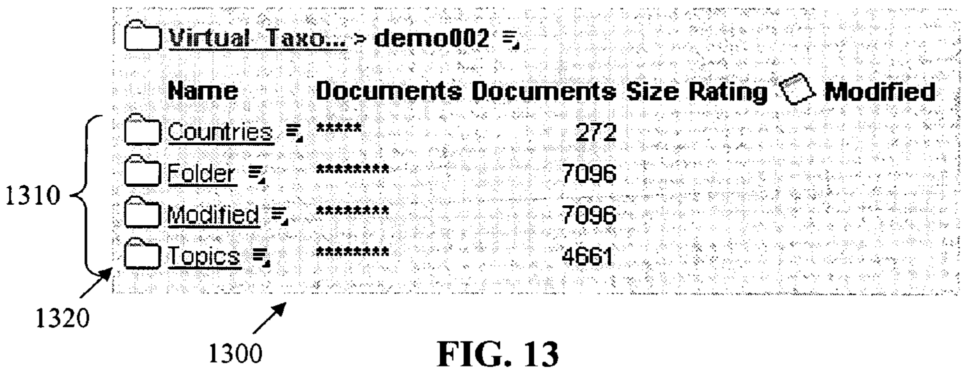

FIG. 13

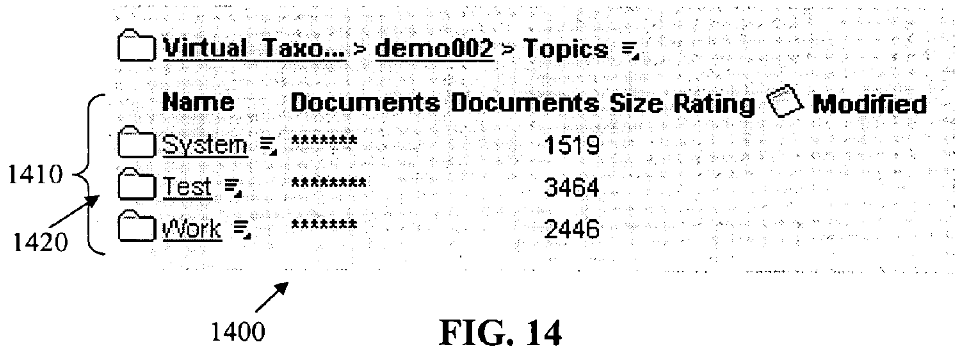

FIG. 14

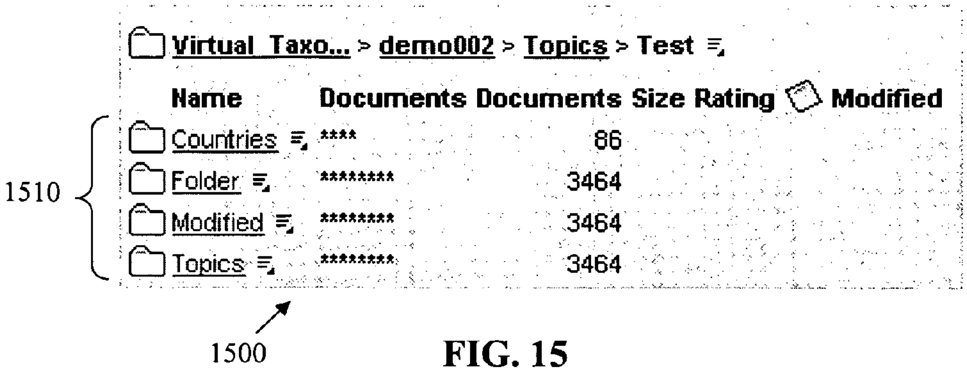

FIG. 15

```
<VIR_TAXONOMY>
<VIR_DEFINITIONS name="demo003" type="guidedNav" maxNumOfFolderDocs="10" guidedNavStrategy="fullAttributeExpansion"
docSeparationNumber="100"
 fixedOrderLevels="1" separationFolderName="Separate: "/>

<VIR_INDEX name="a42_v12"/>
<VIR_INDEX name="a42_v13"/>

<VIR_QUERY name="size">
<VIR_QUERY_RID name = "10000 Byte and less" rid="/taxonomies/aw_a42_virTaxHelper1/Size/10000 Byte and less"/>
<VIR_QUERY_RID name = "10001 Byte - 20000 Byte" rid="/taxonomies/aw_a42_virTaxHelper1/Size/10001 Byte - 20000 Byte"/>
<VIR_QUERY_RID name = "20001 Byte - 30000 Byte" rid="/taxonomies/aw_a42_virTaxHelper1/Size/20001 Byte - 30000 Byte"/>
<VIR_QUERY_RID name = "30001 Byte - 40000 Byte" rid="/taxonomies/aw_a42_virTaxHelper1/Size/30001 Byte - 40000 Byte"/>
<VIR_QUERY_RID name = "40001 Byte - 50000 Byte" rid="/taxonomies/aw_a42_virTaxHelper1/Size/40001 Byte - 50000 Byte"/>
<VIR_QUERY_RID name = "50000 Byte and more" rid="/taxonomies/aw_a42_virTaxHelper1/Size/50000 Byte and more"/>
</VIR_QUERY>

<VIR_ATTR namespace="http://sapportals.com/xmlns/cm" name="folderNameForIndexing" type="useSeparator" separator="/"
displayName = "Folders"
useAllwaysIfSelected="true" displayNameForUseAllways=""/>

<VIR_ATTR namespace="http://sapportals.com/xmlns/cm" name="folderNameForIndexing" type="proposeRanges" displayName =
"Ranges for Folders"/>

<VIR_ATTR namespace="http://sapportals.com/xmlns/cm" name="displayname_as_string" type="proposeRanges" displayName =
"Ranges for Name"/>

<VIR_ATTR namespace="http://sapportals.com/xmlns/cm" name="modified" type="proposeRanges" displayName = "Modified" />

<VIR_QUERY name="Countries">
<VIR_QUERY_RID name = "Germany" rid="/taxonomies/aw_a42_virTaxHelper1/Countries/Germany"/>
<VIR_QUERY_RID name = "France" rid="/taxonomies/aw_a42_virTaxHelper1/Countries/France"/>
<VIR_QUERY_RID name = "Spain" rid="/taxonomies/aw_a42_virTaxHelper1/Countries/Spain"/>
</VIR_QUERY>

</VIR_TAXONOMY>
```

| Virtual Taxo... > demo003 | | | | | |
|---|---|---|---|---|---|
| Name | Documents | Documents Size | Rating | | Modified |
| 10000 Byte and less | ******** | 6582 | | | |
| 10001 Byte - 20000 Byte | ****** | 1519 | | | |
| 20001 Byte - 30000 Byte | ****** | 535 | | | |
| 30001 Byte - 40000 Byte | ***** | 267 | | | |
| 40001 Byte - 50000 Byte | ******* | 1257 | | | |
| 50000 Byte and more | ******** | 3004 | | | |

1700

| Virtual Taxo... > demo003 > 10001 Byte - 20000 Byte | | | | | |
|---|---|---|---|---|---|
| Name | Documents | Documents Size | Rating | | Modified |
| Countries | **** | 125 | | | |
| Folders | ******* | 1519 | | | |
| Modified | ******* | 1519 | | | |
| Ranges for Folders | ******* | 1519 | | | |
| Ranges for Name | ******* | 1519 | | | |

1810

1800

1900

```
<VIR_TAXONOMY>
<VIR_DEFINITIONS name="demo013" type="guidedNav" maxNumOfFolderDocs="10" guidedNavStrategy="usePlan"
docSeparationNumber="100" separationFolderName="Separate: "/>

<VIR_INDEX name="a42_v12"/>
<VIR_INDEX name="a42_v13"/>

<VIR_PLAN>

<VIR_START> <VIR_SUCC nodeName="n1" /> <VIR_SUCC nodeName="n2" /> </VIR_START>

<VIR_NODE nodeName="n1" level = "0" > <VIR_SUCC nodeName="n2" /> <VIR_SUCC nodeName="n4" /> </VIR_NODE>

<VIR_NODE nodeName="n2" level = "1" > <VIR_SUCC nodeName="n3" /> <VIR_SUCC nodeName="n4" />
<VIR_SUCC nodeName="n5" /> </VIR_NODE>

<VIR_NODE nodeName="n3" level = "2" > </VIR_NODE>

<VIR_NODE nodeName="n4" level = "3" > <VIR_SUCC nodeName="n3" /> <VIR_SUCC nodeName="n1" /> </VIR_NODE>

<VIR_NODE nodeName="n5" level = "0" > </VIR_NODE>

</VIR_PLAN>

<VIR_ATTR namespace="http://sapportals.com/xmlns/cm" name="modified" type="proposeRanges" displayName = "Modified: " />

<VIR_QUERY name="Countries">
<VIR_QUERY_RID name = "Germany" rid="/taxonomies/aw_a42_virTaxHelper1/Countries/Germany"/>
<VIR_QUERY_RID name = "France" rid="/taxonomies/aw_a42_virTaxHelper1/Countries/France"/>
<VIR_QUERY_RID name = "Spain" rid="/taxonomies/aw_a42_virTaxHelper1/Countries/Spain"/>
</VIR_QUERY>

<VIR_ATTR namespace="http://sapportals.com/xmlns/cm" name="folderNameForIndexing" type="allValues"
displayName = "Folder Name"/>

<VIR_QUERY name="Size">
<VIR_QUERY_RID name = "10000 Byte and less" rid="/taxonomies/aw_a42_virTaxHelper1/Size/10000 Byte and less"/>
<VIR_QUERY_RID name = "10001 Byte - 20000 Byte" rid="/taxonomies/aw_a42_virTaxHelper1/Size/10001 Byte - 20000 Byte"/>
<VIR_QUERY_RID name = "20001 Byte - 30000 Byte" rid="/taxonomies/aw_a42_virTaxHelper1/Size/20001 Byte - 30000 Byte"/>
<VIR_QUERY_RID name = "30001 Byte - 40000 Byte" rid="/taxonomies/aw_a42_virTaxHelper1/Size/30001 Byte - 40000 Byte"/>
<VIR_QUERY_RID name = "40001 Byte - 50000 Byte" rid="/taxonomies/aw_a42_virTaxHelper1/Size/40001 Byte - 50000 Byte"/>
<VIR_QUERY_RID name = "50000 Byte and more" rid="/taxonomies/aw_a42_virTaxHelper1/Size/50000 Byte and more"/>
</VIR_QUERY>

</VIR_TAXONOMY>
```

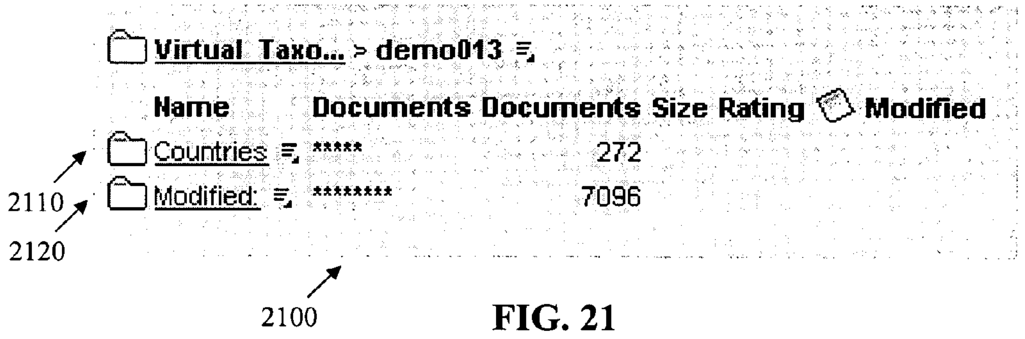

FIG. 21

📁 Virtual Taxo... > demo013 > Modified: ▽

| Name | Documents | Documents Size | Rating | 📄 Modified |
|---|---|---|---|---|
| 📁 1996 ▽ | * | 1 | | |
| 📁 1997 ▽ | * | 4 | | |
| 📁 1998 ▽ | *** | 19 | | |
| 📁 1999 ▽ | *** | 36 | | |
| 📁 2000 ▽ | ***** | 209 | | |
| 📁 2001 ▽ | ******** | 5919 | | |
| 📁 2002 ▽ | ****** | 705 | | |
| 📁 2003 ▽ | ***** | 189 | | |
| 📁 2004 ▽ | ** | 7 | | |
| 📁 2005 ▽ | ** | 6 | | |
| 📁 2099 ▽ | * | 1 | | |

The years rows are grouped as 2210. The table body is 2200.

📁 Virtual Taxo... > demo013 > Modified: > 2001 ▽

| Name | Documents | Documents Size | Rating | 📄 Modified |
|---|---|---|---|---|
| 📁 Countries ▽ | ***** | 209 | | |
| 📁 Size ▽ | ******** | 5758 | | |

2310 points to Countries, 2320 points to Size. The table is 2300.

```
<VIR_TAXONOMY>
<VIR_DEFINITIONS name="demo0031" type="guidedNav" maxNumOfFolderDocs="10" guidedNavStrategy="fullAttributeExpansion"
docSeparationNumber="100"
 fixedOrderLevels="1" separationFolderName="Separate: "/>

<VIR_INDEX name="a42_v12"/>
<VIR_INDEX name="a42_v13"/>

<VIR_QUERY name="size">
<VIR_QUERY_RID name = "10000 Byte and less" rid="/taxonomies/aw_a42_virTaxHelper1/Size/10000 Byte and less"/>
<VIR_QUERY_RID name = "10001 Byte - 20000 Byte" rid="/taxonomies/aw_a42_virTaxHelper1/Size/10001 Byte - 20000 Byte"/>
<VIR_QUERY_RID name = "20001 Byte - 30000 Byte" rid="/taxonomies/aw_a42_virTaxHelper1/Size/20001 Byte - 30000 Byte"/>
<VIR_QUERY_RID name = "30001 Byte - 40000 Byte" rid="/taxonomies/aw_a42_virTaxHelper1/Size/30001 Byte - 40000 Byte"/>
<VIR_QUERY_RID name = "40001 Byte - 50000 Byte" rid="/taxonomies/aw_a42_virTaxHelper1/Size/40001 Byte - 50000 Byte"/>
<VIR_QUERY_RID name = "50000 Byte and more" rid="/taxonomies/aw_a42_virTaxHelper1/Size/50000 Byte and more"/>
</VIR_QUERY>

<VIR_ATTR namespace="http://sapportals.com/xmlns/cm" name="folderNameForIndexing" type="useSeparator" separator="/"
displayName = "Folders" />

<VIR_ATTR namespace="http://sapportals.com/xmlns/cm" name="folderNameForIndexing" type="proposeRanges"  displayName =
"Ranges for Folders"/>

<VIR_ATTR namespace="http://sapportals.com/xmlns/cm" name="displayname_as_string" type="proposeRanges"  displayName =
"Ranges for Name"/>

<VIR_ATTR namespace="http://sapportals.com/xmlns/cm" name="modified" type="proposeRanges" displayName = "Modified" />

<VIR_QUERY name="Countries">
<VIR_QUERY_RID name = "Germany" rid="/taxonomies/aw_a42_virTaxHelper1/Countries/Germany"/>
<VIR_QUERY_RID name = "France" rid="/taxonomies/aw_a42_virTaxHelper1/Countries/France"/>
<VIR_QUERY_RID name = "Spain" rid="/taxonomies/aw_a42_virTaxHelper1/Countries/Spain"/>
</VIR_QUERY>

</VIR_TAXONOMY>
```

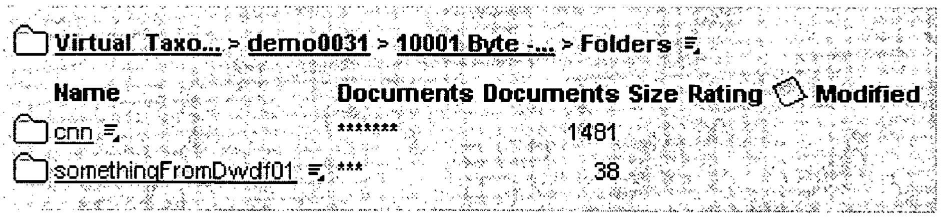

📁 Virtual Taxo... > demo0031 > 10001 Byte -... > Folders > cnn ≡

| Name | Documents | Documents Size | Rating | 🔶 Modified |
|---|---|---|---|---|
| 📁 Countries ≡ | **** | | 125 | |
| 📁 Folders ≡ | ******* | | 1481 | |
| 📁 Modified ≡ | ******* | | 1481 | |
| 📁 Ranges for Folders ≡ | ******* | | 1481 | |
| 📁 Ranges for Name ≡ | ******* | | 1481 | |

2600

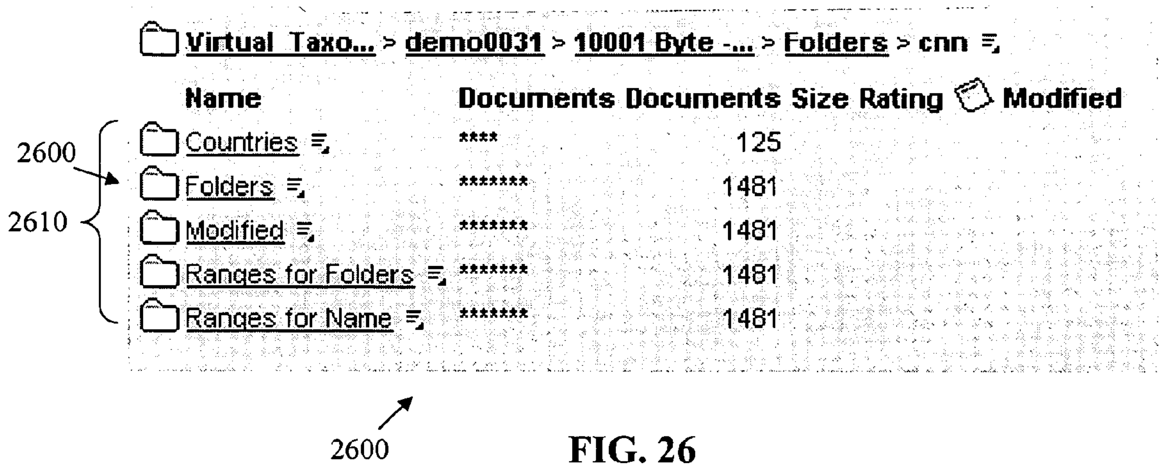

FIG. 26

📁 Virtual Taxo... > demo0031 > 10001 Byte -... > Folders > cnn > Folders ≡

| Name | Documents | Documents Size | Rating | 🔶 Modified |
|---|---|---|---|---|
| 📁 Business ≡ | ***** | | 203 | |
| 📁 Entertainment ≡ | ***** | | 283 | |
| 📁 Health ≡ | ***** | | 161 | |
| 📁 Law ≡ | **** | | 62 | |
| 📁 Misc ≡ | **** | | 133 | |
| 📁 Nature ≡ | **** | | 77 | |
| 📁 New Documents ≡ | * | | 1 | |
| 📁 Politics ≡ | **** | | 55 | |
| 📁 Sports ≡ | ***** | | 233 | |
| 📁 Technology ≡ | **** | | 103 | |
| 📁 US ≡ | **** | | 67 | |
| 📁 World ≡ | **** | | 103 | |

2700

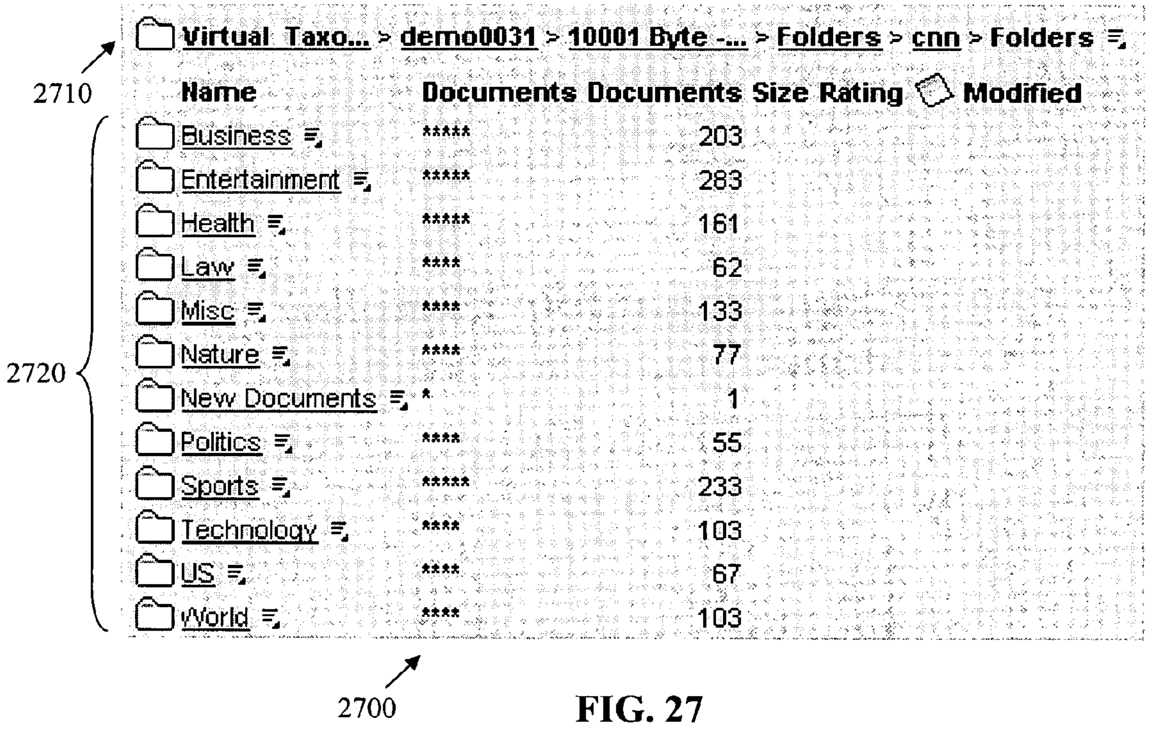

FIG. 27

| | Virtual Taxo... > demo003 > 10000 Byte a... > Folders > cnn ≡ | | | | | |
|---|---|---|---|---|---|---|
| **Name** | **Documents** | **Documents** | **Size** | **Rating** | 🗂 | **Modified** |
| 📁 Achim ≡ | * | | 1 | | | |
| 📁 Business ≡ | ***** | | 273 | | | |
| 📁 Entertainment ≡ | ***** | | 371 | | | |
| 📁 Health ≡ | ***** | | 294 | | | |
| 📁 Law ≡ | ***** | | 277 | | | |
| 📁 Misc ≡ | ****** | | 876 | | | |
| 📁 Nature ≡ | **** | | 99 | | | |
| 📁 New Documents ≡ | * | | 2 | | | |
| 📁 Politics ≡ | ******** | | 3240 | | | |
| 📁 Sports ≡ | ***** | | 269 | | | |
| 📁 Technology ≡ | **** | | 115 | | | |
| 📁 US ≡ | **** | | 78 | | | |
| 📁 World ≡ | **** | | 109 | | | |

3020, 3030, 3010 → (folder groupings)
3000 →

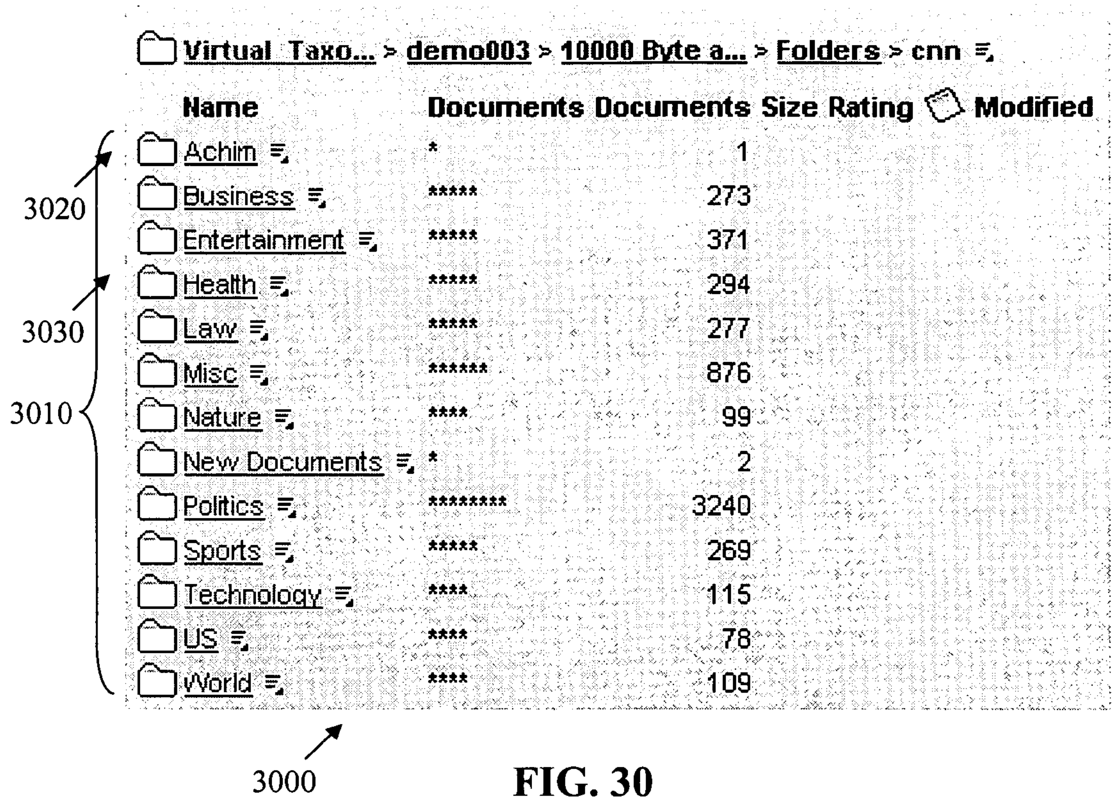

FIG. 30

| | Virtual Taxo... > demo003 > 10000 Byte a... > Folders > cnn > Health ≡ | | | | |
|---|---|---|---|---|---|
| **Name** | **Documents** | **Documents** | **Size** | **Rating** 🗂 | **Modified** |
| 📁 Aging ≡ | *** | | 27 | | |
| 📁 Aids ≡ | *** | | 25 | | |
| 📁 Alternative ≡ | *** | | 25 | | |
| 📁 Cancer ≡ | *** | | 25 | | |
| 📁 Children ≡ | *** | | 29 | | |
| 📁 Diet ≡ | *** | | 27 | | |
| 📁 Men ≡ | *** | | 31 | | |
| 📁 Women ≡ | *** | | 26 | | |
| 📄 25001.htm ≡ | | | 35,1 KB | | 05.04.01 03:39:00 |
| 📄 25002.htm ≡ | | | 38 KB | | 05.04.01 03:41:19 |
| 📄 25003.htm ≡ | | | 34,5 KB | | 05.04.01 03:55:12 |
| 📄 25004.htm ≡ | | | 36,2 KB | | 05.04.01 03:45:58 |
| 📄 25005.htm ≡ | | | 40 KB | | 05.04.01 03:42:03 |
| 📄 25006.htm ≡ | | | 36,3 KB | | 05.04.01 03:45:33 |
| 📄 25007.htm ≡ | | | 47,4 KB | | 05.04.01 03:39:02 |

1-15 16-30 31-45 46-60 61-75 76-87 > >> / 87

3110, 3120 → (groupings)
3100 →

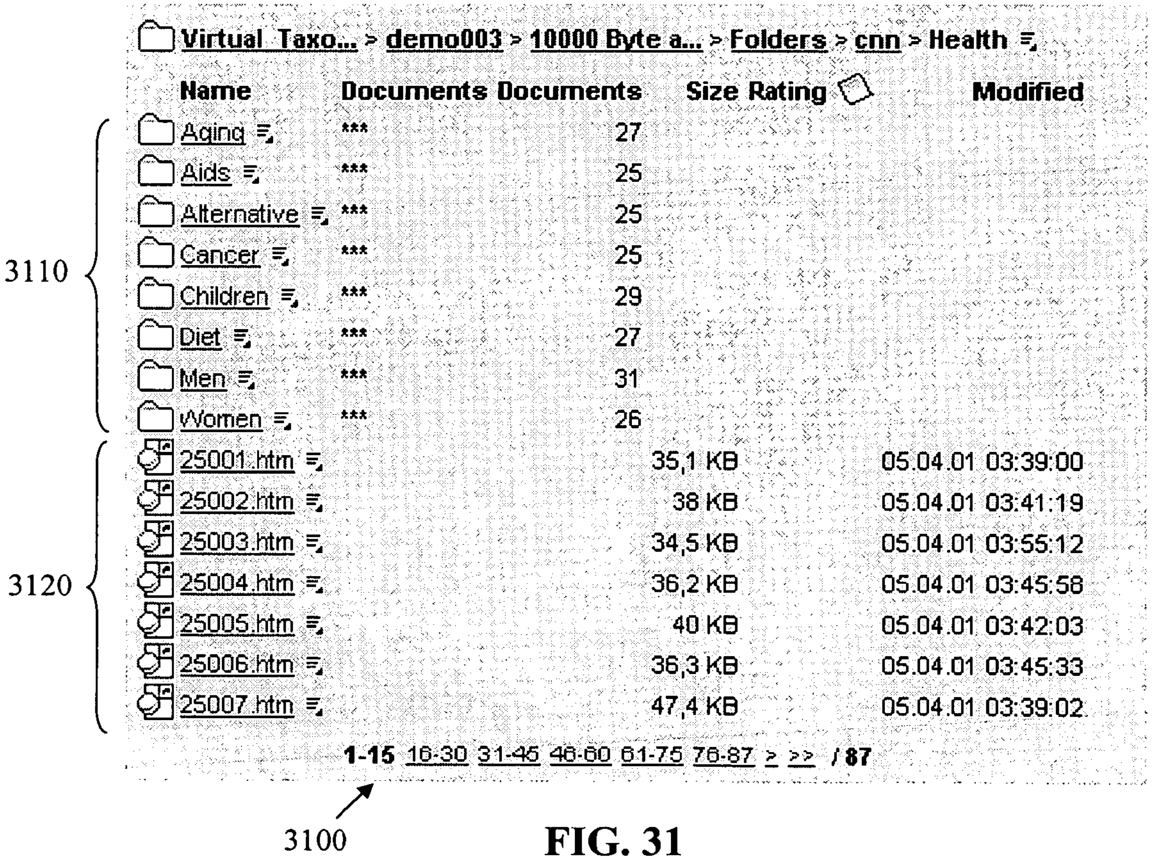

FIG. 31

```
<VIR_TAXONOMY>
<VIR_DEFINITIONS name="demo007" type="guidedNav" maxNumOfFolderDocs="10" guidedNavStrategy="fullAttributeExpansion"
docSeparationNumber="100"/>

<VIR_INDEX name="a42_v12"/>
<VIR_INDEX name="a42_v13"/>

<VIR_ATTR namespace="http://sapportals.com/xmlns/cm" name="modified" type="proposeRanges" displayName = "Modified" />

<VIR_ATTR namespace="http://sapportals.com/xmlns/cm" name="folderNameForIndexing" type="allValues"
displayName = "Folders" />

<VIR_QUERY name="Topics">
<VIR_QUERY_RID name = "Test" rid="/taxonomies/aw_a42_virTaxHelper1/Topics/Test"/>
<VIR_QUERY_RID name = "System" rid="/taxonomies/aw_a42_virTaxHelper1/Topics/System"/>
<VIR_QUERY_RID name = "Work" rid="/taxonomies/aw_a42_virTaxHelper1/Topics/Work"/>
</VIR_QUERY>

<VIR_QUERY name="Countries">
<VIR_QUERY_RID name = "Germany" rid="/taxonomies/aw_a42_virTaxHelper1/Countries/Germany"/>
<VIR_QUERY_RID name = "France" rid="/taxonomies/aw_a42_virTaxHelper1/Countries/France"/>
<VIR_QUERY_RID name = "Spain" rid="/taxonomies/aw_a42_virTaxHelper1/Countries/Spain"/>
</VIR_QUERY>

<VIR_QUERY name="Walk in Taxonomy" workInQBT="true">
<VIR_QUERY_RID name = "help" rid="/taxonomies/aw_a42_virTaxHelper1/walkTax01"/>
</VIR_QUERY>

<VIR_ATTR namespace="http://sapportals.com/xmlns/cm" name="contentlength" type="proposeRanges"
displayName = "Content Length: " distributionAlgm = "equidistribution" optimalRangeNumber="10" />

</VIR_TAXONOMY>
```

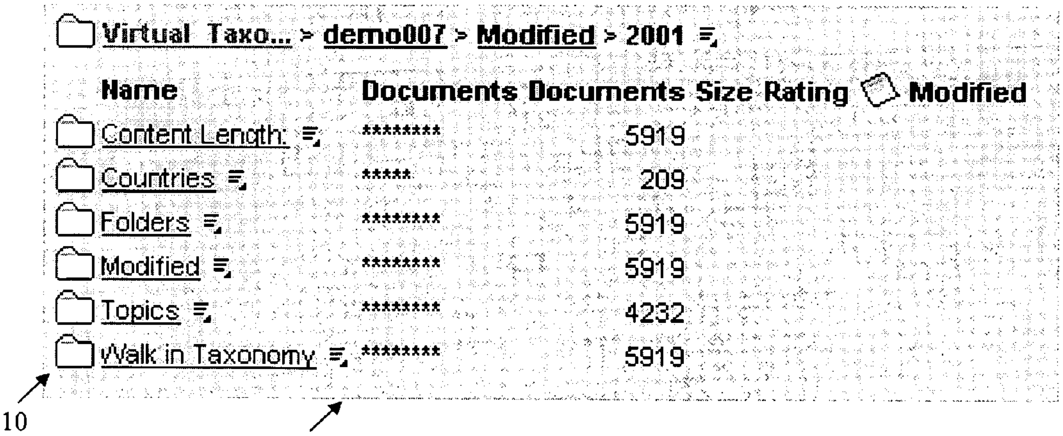

| Virtual Taxo... > demo007 > Modified > 2001 > Walk in Taxonomy | | | | | |
|---|---|---|---|---|---|
| Name | Documents | Documents Size | Rating | | Modified |
| No query | ******** | 5919 | | | |

3400   FIG. 34

| Virtual Taxo... > demo007 > Modified > 2001 > Walk in Taxo... > No query | | | | | |
|---|---|---|---|---|---|
| Name | Documents | Documents | Size | Rating | Modified |
| System | ******** | 1224 | | | |
| Test | ******** | 3186 | | | |
| 0.html | | | 18 KB | | 24.02.01 20:38:02 |
| 1.html | | | 16,6 KB | | 24.02.01 20:38:10 |
| 10.html | | | 17,9 KB | | 24.02.01 20:38:24 |
| 100.html | | | 15,8 KB | | 24.02.01 20:39:34 |
| 1000.html | | | 15,4 KB | | 24.02.01 20:49:18 |
| 1001.html | | | 15,8 KB | | 24.02.01 20:49:18 |
| 1002.html | | | 16,6 KB | | 24.02.01 20:49:18 |
| 1003.html | | | 16,5 KB | | 24.02.01 20:49:18 |
| 1004.html | | | 20,3 KB | | 24.02.01 20:49:20 |
| 1006.html | | | 15,4 KB | | 24.02.01 20:49:20 |
| 1008.html | | | 15,4 KB | | 24.02.01 20:49:22 |
| 1009.html | | | 18,3 KB | | 24.02.01 20:49:22 |
| 101.html | | | 15,8 KB | | 24.02.01 20:39:34 |

Figures 36, 37:
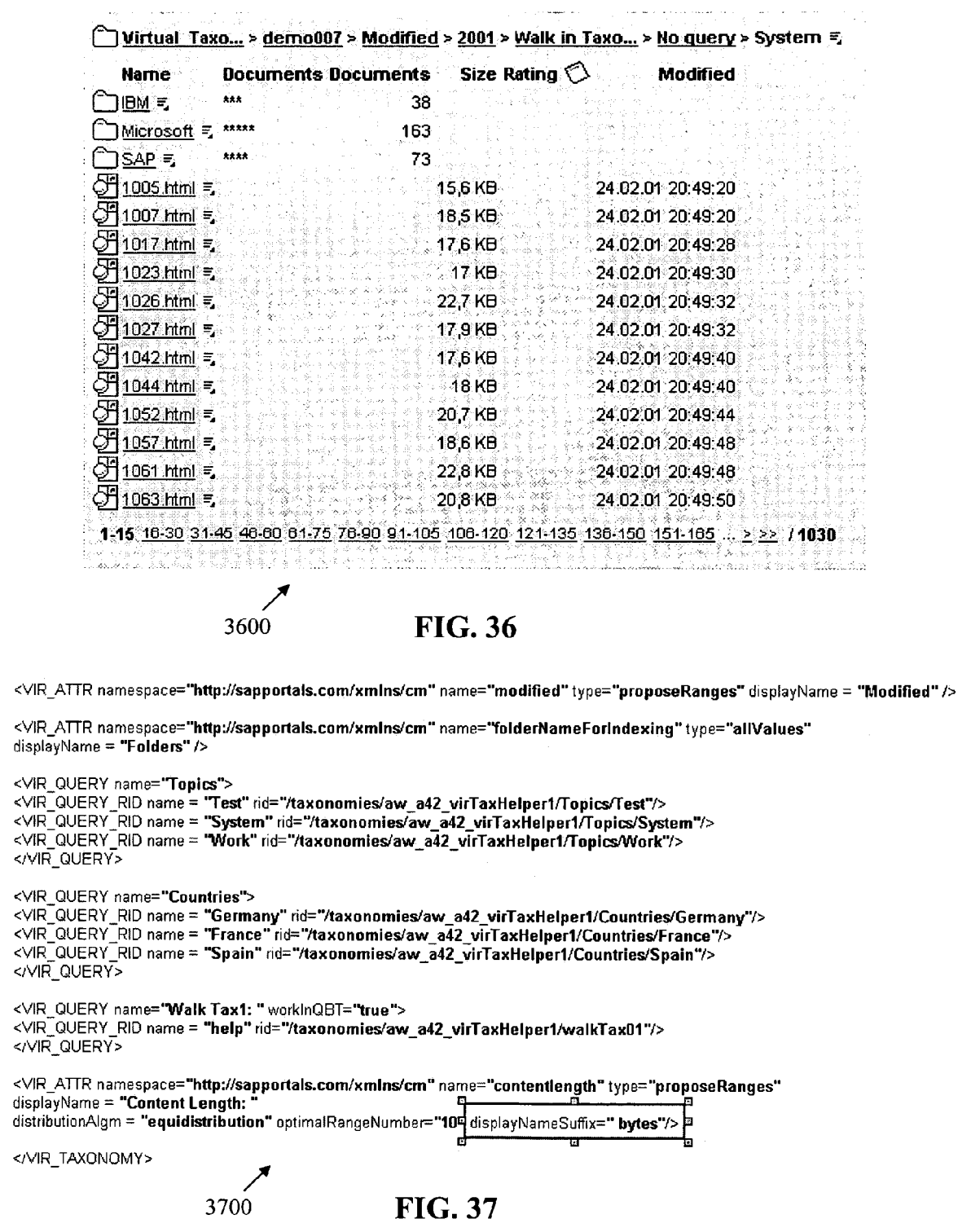

Virtual Taxo... > demo007 > Modified > 2001 > Walk in Taxo... > No query > System

| Name | Documents | Documents | Size | Rating | Modified |
|---|---|---|---|---|---|
| IBM | *** | 38 | | | |
| Microsoft | ***** | 163 | | | |
| SAP | **** | 73 | | | |
| 1005.html | | | 15,6 KB | | 24.02.01 20:49:20 |
| 1007.html | | | 18,5 KB | | 24.02.01 20:49:20 |
| 1017.html | | | 17,6 KB | | 24.02.01 20:49:28 |
| 1023.html | | | 17 KB | | 24.02.01 20:49:30 |
| 1026.html | | | 22,7 KB | | 24.02.01 20:49:32 |
| 1027.html | | | 17,9 KB | | 24.02.01 20:49:32 |
| 1042.html | | | 17,6 KB | | 24.02.01 20:49:40 |
| 1044.html | | | 18 KB | | 24.02.01 20:49:40 |
| 1052.html | | | 20,7 KB | | 24.02.01 20:49:44 |
| 1057.html | | | 18,6 KB | | 24.02.01 20:49:48 |
| 1061.html | | | 22,8 KB | | 24.02.01 20:49:48 |
| 1063.html | | | 20,8 KB | | 24.02.01 20:49:50 |

```
<VIR_ATTR namespace="http://sapportals.com/xmlns/cm" name="modified" type="proposeRanges" displayName = "Modified" />

<VIR_ATTR namespace="http://sapportals.com/xmlns/cm" name="folderNameForIndexing" type="allValues"
displayName = "Folders" />

<VIR_QUERY name="Topics">
<VIR_QUERY_RID name = "Test" rid="/taxonomies/aw_a42_virTaxHelper1/Topics/Test"/>
<VIR_QUERY_RID name = "System" rid="/taxonomies/aw_a42_virTaxHelper1/Topics/System"/>
<VIR_QUERY_RID name = "Work" rid="/taxonomies/aw_a42_virTaxHelper1/Topics/Work"/>
</VIR_QUERY>

<VIR_QUERY name="Countries">
<VIR_QUERY_RID name = "Germany" rid="/taxonomies/aw_a42_virTaxHelper1/Countries/Germany"/>
<VIR_QUERY_RID name = "France" rid="/taxonomies/aw_a42_virTaxHelper1/Countries/France"/>
<VIR_QUERY_RID name = "Spain" rid="/taxonomies/aw_a42_virTaxHelper1/Countries/Spain"/>
</VIR_QUERY>

<VIR_QUERY name="Walk Tax1: " workInQBT="true">
<VIR_QUERY_RID name = "help" rid="/taxonomies/aw_a42_virTaxHelper1/walkTax01"/>
</VIR_QUERY>

<VIR_ATTR namespace="http://sapportals.com/xmlns/cm" name="contentlength" type="proposeRanges"
displayName = "Content Length: "
distributionAlgm = "equidistribution" optimalRangeNumber="10" displayNameSuffix=" bytes"/>

</VIR_TAXONOMY>
```

```
<VIR_TAXONOMY>
<VIR_DEFINITIONS name="demo009" type="guidedNav" maxNumOfFolderDocs="10" guidedNavStrategy="fullAttributeExpansion" docSeparationNumber="100"/>

<VIR_INDEX name="a42_v12"/>
<VIR_INDEX name="a42_v13"/>

<VIR_ATTR namespace="http://sapportals.com/xmlns/cm" name="contentlength" type="proposeRanges" displayName = "Content Length 1000: "
distributionAlgm = "ranges" rangeDefinition="l0[interval=1000,start=0,end=100000]" displayNameSuffix=" bytes"/>

<VIR_ATTR namespace="http://sapportals.com/xmlns/cm" name="contentlength" type="proposeRanges" displayName = "Content Length 10000: "
distributionAlgm = "ranges" rangeDefinition="l0[interval=10000,start=0,end=100000],l1[interval=1000,start=0,end=100000]" displayNameSuffix=" bytes"/>

<VIR_ATTR namespace="http://sapportals.com/xmlns/cm" name="contentlength" type="proposeRanges" displayName = "Content Length Round: "
distributionAlgm = "round" displayNameSuffix=" bytes"/>

<VIR_ATTR namespace="http://sapportals.com/xmlns/cm" name="contentlength" type="proposeRanges" displayName = "Content Length Seperate: "
distributionAlgm = "seperateRanges"
rangeDefinition="l0[value1=0,value2=5000,operator=BT],l0[value1=6000,value2=10000,operator=BT],
l1[value1=1000,value2=2000,operator=BT],l1[value1=3000,value2=5000,operator=BT]" displayNameSuffix=" bytes"/>

<VIR_ATTR namespace="http://sapportals.com/xmlns/cm" name="displayname_as_string" type="proposeRanges" displayName = "Name Ranges: "
distributionAlgm = "seperateRanges"
rangeDefinition="l0[value1=a,value2=k,operator=BT],l0[value1=l,value2=z,operator=BT]" />

<VIR_ATTR namespace="http://sapportals.com/xmlns/cm" name="displayname_as_string" type="proposeRanges" displayName = "Name Cataloque: "
distributionAlgm = "seperateRanges"
rangeDefinition="l0[value1=a,value2=k&#xfffd;,operator=BT],l0[value1=l,value2=z&#xfffd;,operator=BT]" />

<VIR_ATTR namespace="http://sapportals.com/xmlns/cm" name="displayname_as_string" type="proposeRanges" displayName = "Name Round: "
distributionAlgm = "round" />

<VIR_ATTR namespace="http://sapportals.com/xmlns/cm" name="displayname_as_string" type="proposeRanges" displayName = "Name Propose Ranges: "
distributionAlgm = "equidistribution" />
```

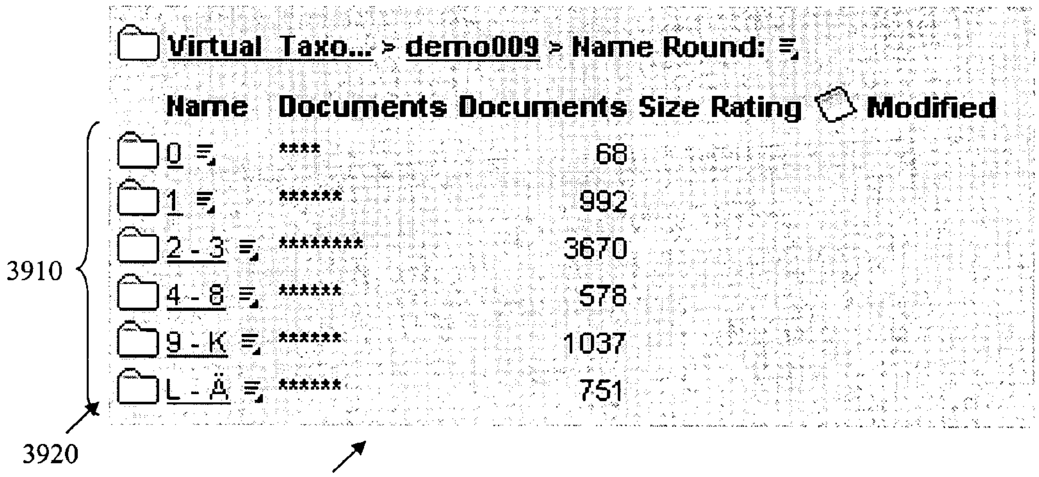

|  | Virtual Taxo... > demo009 > Name Round: > L - Ä > Name Round: |  |  |  |
|---|---|---|---|---|
| Name | Documents | Documents Size | Rating | Modified |
| 📁 L | *** | 39 | | |
| 📁 M | **** | 100 | | |
| 📁 N - O | *** | 42 | | |
| 📁 P | **** | 114 | | |
| 📁 Q | ** | 6 | | |
| 📁 R | **** | 67 | | |
| 📁 S | ***** | 189 | | |
| 📁 T - V | **** | 96 | | |
| 📁 W - Ä | **** | 98 | | |

4010 brackets rows L through S; 4020 points to T-V and W-Ä

FIG. 40 (4000)

|  | Virtual Taxo... > demo009 > Name Round: > L - Ä > Name Round: > S > Name Round: |  |  |  |
|---|---|---|---|---|
| Name | Documents | Documents Size | Rating | Modified |
| 📁 SA - SB | *** | 42 | | |
| 📁 SC - SD | ** | 6 | | |
| 📁 SE - SG | ** | 12 | | |
| 📁 SH - SN | **** | 66 | | |
| 📁 SO | ** | 6 | | |
| 📁 SP - SS | ** | 12 | | |
| 📁 ST | *** | 18 | | |
| 📁 SU - SY | *** | 27 | | |

4110 brackets all rows

FIG. 41 (4100)

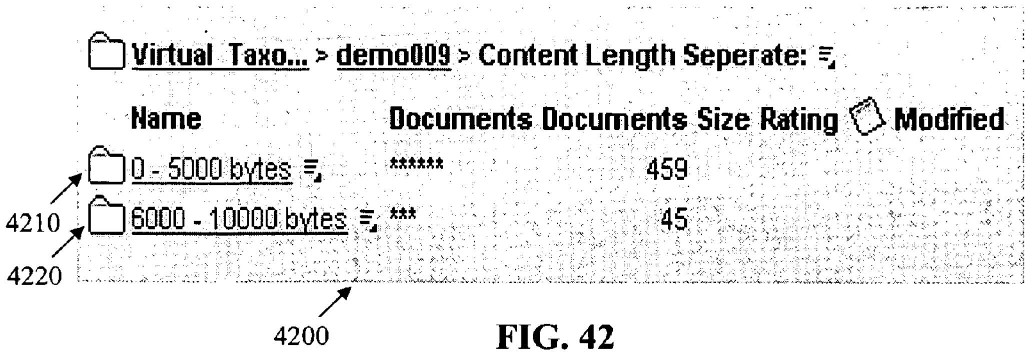

FIG. 42

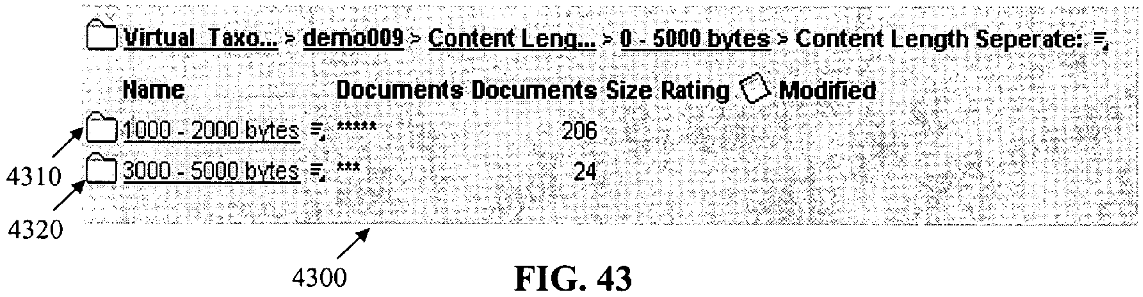

FIG. 43

```
<VIR_TAXONOMY>
<VIR_DEFINITIONS name="demo011" type="guidedNav" maxNumOfFolderDocs="10" guidedNavStrategy="fullAttributeExpansion"
docSeparationNumber="100" noIntermediateFolder="true" />

<VIR_INDEX name="a42_v12"/>
<VIR_INDEX name="a42_v13"/>

<VIR_ATTR namespace="http://sapportals.com/xmlns/cm" name="modified" type="proposeRanges" displayName = " " />

<VIR_QUERY name="Countries">
<VIR_QUERY_RID name = "Germany" rid="/taxonomies/aw_a42_virTaxHelper1/Countries/Germany"/>
<VIR_QUERY_RID name = "France" rid="/taxonomies/aw_a42_virTaxHelper1/Countries/France"/>
<VIR_QUERY_RID name = "Spain" rid="/taxonomies/aw_a42_virTaxHelper1/Countries/Spain"/>
</VIR_QUERY>

</VIR_TAXONOMY>
```

| Virtual Taxo... > demo011 | | | | | |
|---|---|---|---|---|---|
| Name | Documents | Documents Size | Rating | 🗍 | Modified |
| 📁 1996 | * | 1 | | | |
| 📁 1997 | * | 4 | | | |
| 📁 1998 | *** | 19 | | | |
| 📁 1999 | *** | 36 | | | |
| 📁 2000 | ***** | 209 | | | |
| 📁 2001 | ******** | 5919 | | | |
| 📁 2002 | ****** | 705 | | | |
| 📁 2003 | ***** | 189 | | | |
| 📁 2004 | ** | 7 | | | |
| 📁 2005 | ** | 6 | | | |
| 📁 2099 | * | 1 | | | |
| 📁 France | **** | 127 | | | |
| 📁 Germany | ***** | 163 | | | |
| 📁 Spain | **** | 57 | | | |

4500

BREADCRUMB WITH ALTERNATIVE RESTRICTION TRAVERSAL

TECHNICAL FIELD

The subject matter described herein relates to categorizing documents and other data files in a breadcrumb with alternative restriction traversal options.

BACKGROUND

Search queries are continually being generated and executed in relation to expanding numbers of documents and other data sources. However, difficulties arise when large numbers of matching documents are presented in response to a query. In particular, it is often difficult to categorize and traverse various groups of responsive documents in an efficient and user-friendly fashion.

SUMMARY

In one aspect, a breadcrumb is displayed or otherwise provided that identifies at least two restrictions of a plurality of documents in a sequence. Thereafter, a graphical user interface element associated with a selected one of the restrictions having at least one subsequent restriction in the sequence may be activated. After the selection of the graphical user interface element, at least one attribute and a numeric indication of a number of the documents responsive to each restriction prior to the selected restriction that contain the attribute and each restriction in the sequence subsequent to the selected restriction is displayed.

Selection of the displayed attribute may cause the breadcrumb to be modified to include that attribute in the sequence. Alternatively, one or more documents responsive to each restriction in the modified breadcrumb and/or information associated with such documents (e.g., titles, summaries, etc.) may be displayed.

When a restriction in the breadcrumb is selected, there may be a list of attributes which are displayed. Such a list may include a fixed number of attributes or it may only include attributes in which there are responsive documents (i.e., documents in which each restriction including the selected attribute may be found). In some variations, the order in which the attributes are presented may be adjusted (or ranked) according to factors such as: number of responsive documents containing the displayed attributes, most recently accessed documents containing the displayed attributes, most frequently accessed documents containing the displayed attributes, alphabetical order, and the like. Additionally, in some variations, the listing of the attributes and/or access to documents may be based on a permission level associated with the user.

In another interrelated aspect, a first subset of categories of documents responsive to a search query and optionally a number of the documents associated with each first subset category are displayed. Each document may have one or more associated attributes to allow the categories to form hierarchical nodes of a virtual taxonomy. The documents are arranged in the nodes of the virtual taxonomy according to their respective one or more associated attributes. Additionally, a selection of a graphical user interface element associated with one of the categories in the first subset is received. Thereafter, a second subset of categories of documents responsive to the search query and optionally a number of the documents associated with one or more of the second subset categories is displayed. The second subset of documents comprises one or more categories residing on at least one of a sister node to a node associated with the selected category and a node descending therefrom. In some variations, the number of associated documents is omitted.

In some variations, at least a portion of the documents may be displayed under a corresponding category. Additionally or in the alternative, a second search query may be received such that a third subset of documents may be identified which are responsive to the search query and which are within the node associated with the selected category and its child nodes. Moreover, at least a portion of the third subset of documents or categories associated with the identified third subset of documents may be displayed. Documents may be displayed when the number of documents within a certain category are below a predetermined level.

In some arrangements, the displayed categories are pairwise disjoint—which results in each document falling within only a single category. In other variations, a single document may reside within several categories. In order to aid review of the folders and documents responsive to a query (e.g., a key word search query or a query defined by navigation through the virtual taxonomy), the displayed categories may contain a substantially identical number of documents. Alternatively, there may be a fixed number of categories which are designated after determining how many responsive documents should be distributed therein.

The displayed categories may be based on integer identifications and/or alphanumeric strings. The categories may also be separated by a pre-determined fixed interval. These intervals may contains gaps therebetween.

Access to certain categories and/or documents may be limited based on permission status of a user. For example, access to certain displayed categories and/or documents may only be granted to users having a predetermined permission level. Alternatively, only categories and/or documents which a user has permission to access may be displayed.

At least a portion of the traversed categories may be displayed in a breadcrumb navigational arrangement. For example, SAP→Business Solutions→Advanced Technologies→Data Warehousing. A user may select any of these categories and conduct a search of the documents below such category.

In other variations, only categories having less than a predetermined number of ancestor nodes intermediate a root node may be displayed. For example, in some circumstances, it may be desirable to only display the "deepest" folders within a taxonomy.

In an interrelated aspect, a first subset of categories of a plurality of documents responsive to a search query and limited by at least one restriction and optionally a number of the plurality of documents associated with each first subset category in a breadcrumb navigational arrangement are displayed. These documents also include one or more associated attributes that are used to define categories of a virtual taxonomy. The documents are arranged in the virtual taxonomy according to their respective one or more associated attributes. After a selection of a graphical user interface element associated with one of the categories in the first subset is received, a second subset of categories of a plurality of documents responsive to the search query and a number of the plurality of documents associated with each second subset category are displayed. This second subset comprises one or more categories residing on at least one of a sister node to a node associated with the selected category or a node descending therefrom.

In a further interrelated aspect, a first subset of categories of documents forming part of a virtual taxonomy that are responsive to a search query and a number of the documents associated with each first subset category are displayed. In response to the selection of a graphical user interface element (e.g., a folder icon, etc.) associated with one of the categories in the first subset and one or more restrictions to the search query, a second subset of categories of documents responsive to the search query and limited by the one or more restrictions and a number of the documents associated with each second subset category are displayed.

Computer program products, which may be embodied on computer readable-material, are also described. Such computer program products may include executable instructions that cause a computer system to conduct one or more of the method acts described herein.

Similarly, computer systems are also described that may include a processor and a memory coupled to the processor. The memory may encode one or more programs that cause the processor to perform one or more of the method acts described herein.

The subject matter described herein provides many advantages. The techniques for selectively displaying documents responsive to a search query as described herein prevent overly complex combinatorial arrangements of documents. Moreover, flexible navigation alternatives are provided thereby increasing usability when traversing a large number of documents responsive to a search query. Such improvements in navigation may be used for a wide variety of applications including internal enterprise portals and auction and other websites selling a large number of goods and services. In particular, the subject matter described herein allows for taxonomies to be computed on the fly during navigation so that documents may be categorized according to time intervals such as last week, last day, last seven hours, week before, from 10 to 5 days before, and the like.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 illustrates hierarchically arranged nodes within a virtual taxonomy;

FIG. 4 illustrates XML code defining a fixed order taxonomy;

FIG. 5 illustrates a first level of a first taxonomy;

FIG. 6 illustrates a second level of the taxonomy of FIG. 5;

FIG. 7 illustrates a third level of the taxonomy of FIG. 5;

FIG. 8 illustrates a fourth level of the taxonomy of FIG. 5;

FIG. 9 illustrates a fifth level of the taxonomy of FIG. 5;

FIG. 12 illustrates XML code for generating a full expansion taxonomy;

FIG. 13 illustrates a first level of a second taxonomy;

FIG. 14 illustrates a second level of the taxonomy of FIG. 13;

FIG. 15 illustrates a third level of the taxonomy of FIG. 13;

FIG. 16 illustrates XML code to generate a taxonomy with both fixed order and full expansions;

FIG. 20 illustrates XML code to generate a taxonomy according to the execution plan of FIG. 19;

FIG. 21 illustrates a first level of a fourth taxonomy according to the execution plan of FIG. 19;

FIG. 24 illustrates XML code to generate a taxonomy based on multiple data sources;

FIG. 25 illustrates a first level of a fifth taxonomy generated according to the XML code of FIG. 24;

FIG. 26 illustrates a second level of the taxonomy of FIG. 25;

FIG. 27 illustrates a third level of the taxonomy of FIG. 25;

FIG. 30 illustrates a second level of the taxonomy of FIG. 29;

FIG. 31 illustrates a third level of the taxonomy of FIG. 29;

FIG. 32 illustrates XML code for implementing a Walk in Taxonomy;

FIG. 33 illustrates a first level of an eighth taxonomy generated according to the XML code of FIG. 32;

FIG. 36 illustrates a fourth level of the taxonomy of FIG. 34;

FIG. 37 illustrates XML code for generating taxonomies with unit labels;

FIG. 38 illustrates XML code for designating range borders for folder groupings;

FIG. 39 illustrates a first level of a ninth taxonomy with range border specified by the XML code of FIG. 38;

FIG. 42 illustrates a first level of a tenth taxonomy in which gaps in ranges are present;

FIG. 43 illustrates a second level of the taxonomy of FIG. 42;

FIG. 44 illustrates XML code defines a taxonomy in which intermediate folders containing responsive documents are bypassed;

Like reference symbols in the various drawings indicate like elements.

DETAILED DESCRIPTION

Figure 1:
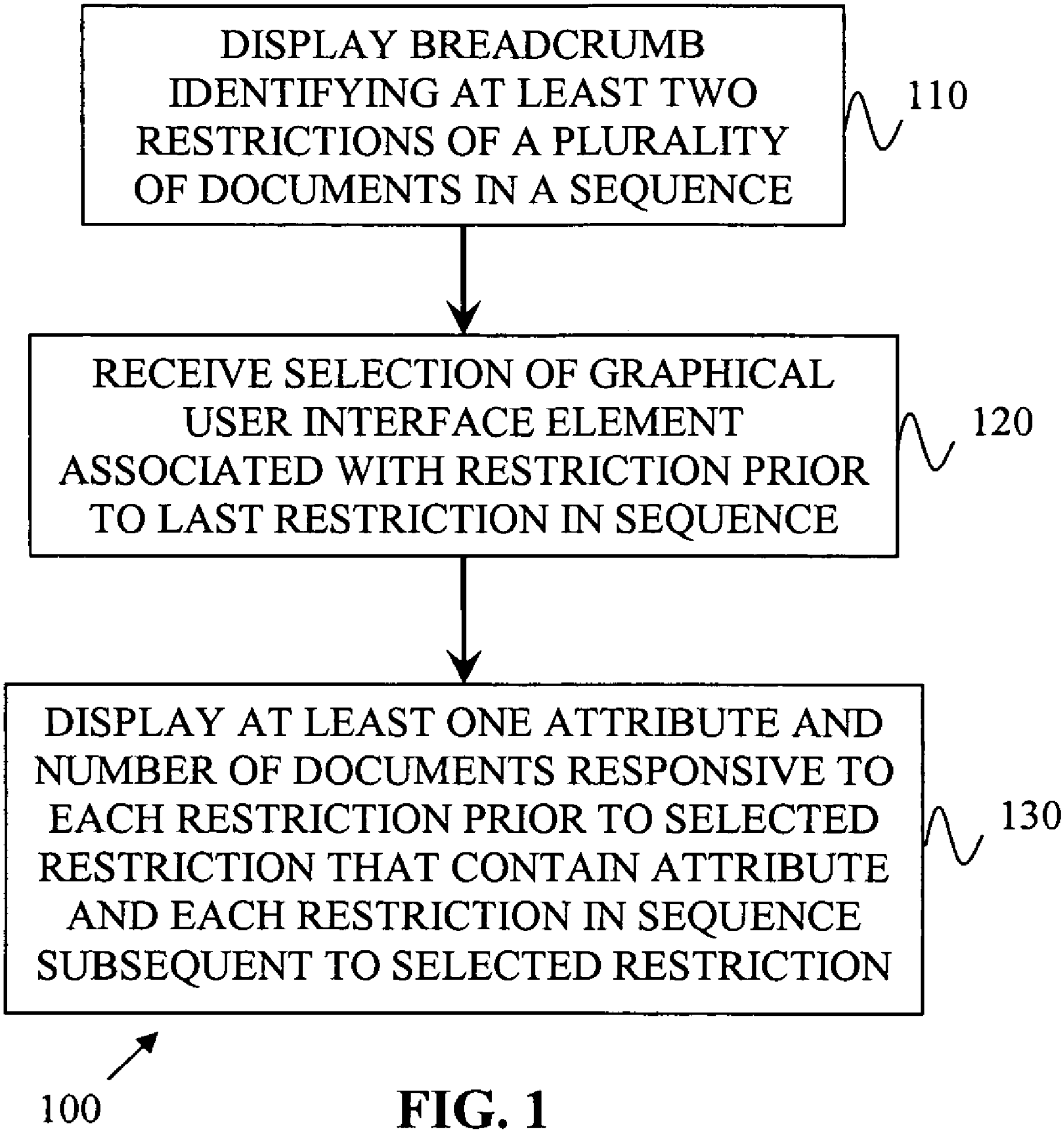
FIG. 1 is a process flow diagram illustrating a method of selectively displaying documents responsive to a restriction in a breadcrumb.

FIG. 1 is a process flow diagram illustrating a method 100 in which, at 110, a breadcrumb identifying at least two restrictions of a plurality of documents in a sequence is displayed. Thereafter, at 120, a selection of a graphical user interface element associated with a selected one of the restrictions having at least one subsequent restriction in the sequence is received. In response to this selection, at 130, at least one attribute and a numeric indication of a number of the documents responsive to each restriction prior to the selected restriction that contain the attribute and each restriction in the sequence subsequent to the selected restriction is displayed.

Figure 2:
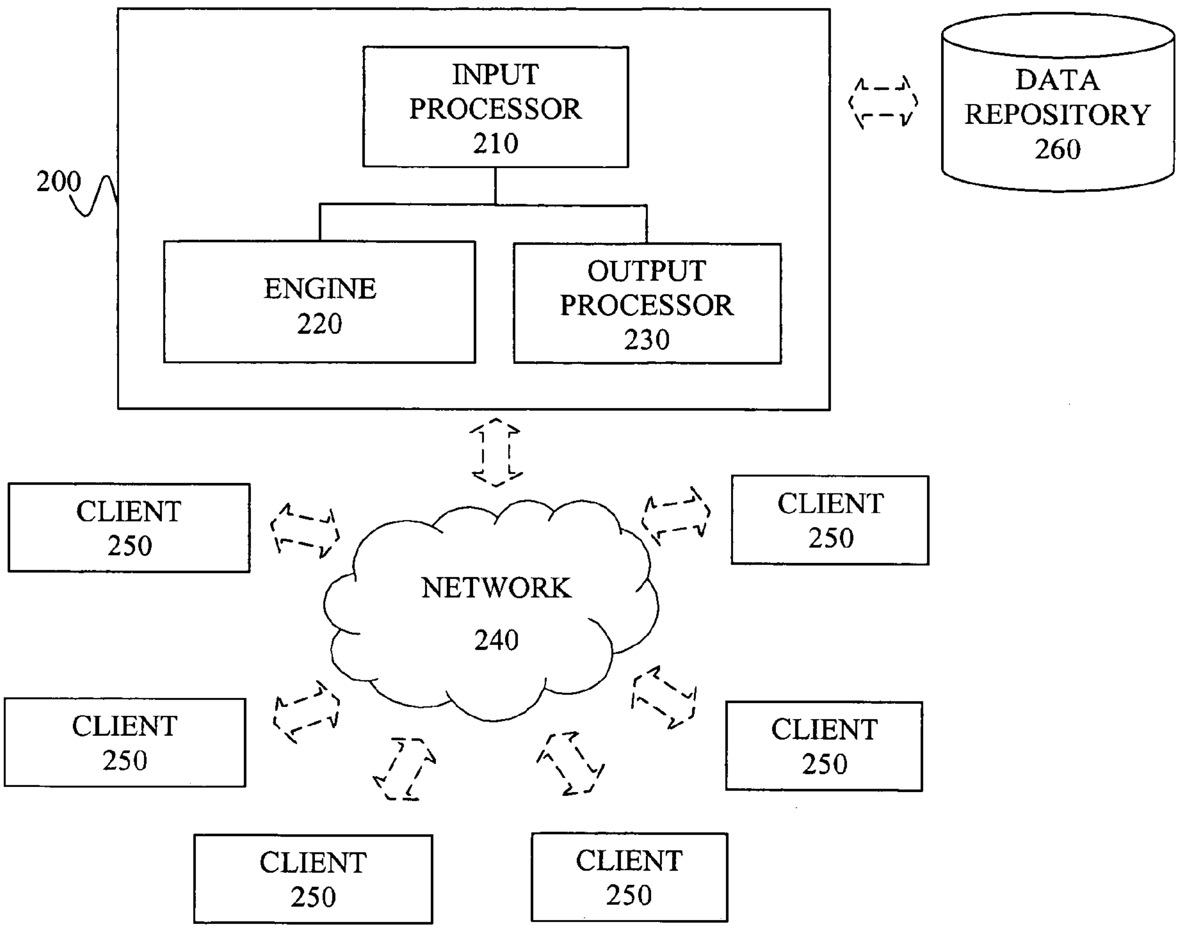
FIG. 2 is a schematic diagram illustrating an apparatus to display documents in a virtual taxonomy.

FIG. 2 is a schematic diagram of an apparatus 200 comprising an input processor 210, an engine 220, and an output processor 230. The apparatus 200 may be coupled to a plurality of clients 250 via a communications network. In addition, the apparatus 200 may optionally be coupled to or include a data repository 260 which stores documents responsive to a search query.

The input processor 210 may receive a restriction from one of the plurality of clients 250 via the communications network 240. This search query/restriction may then be provided to the engine 220 which, via the output processor 230, polls the data repository 260 to obtain responsive documents. The engine 220, in some variations, may additionally poll the data repository 260 for one or more indexes which may be used to identify documents responsive to the restriction as well as any preceding and subsequent restrictions in the sequence. The engine 220 also constructs a breadcrumb and/or a virtual taxonomy for the identified responsive documents and generates data to be provided to the requesting client 250 so that the client 250 can in turn render a graphical representation of at least a portion of the breadcrumb and/or virtual taxonomy. Optionally, information characterizing documents associated with each restriction or category may be displayed.

FIG. 3 illustrates a virtual taxonomy 300 (also referred to as a tree) relating to a set of documents relating to automobiles. Each document contains a property identifying an automobile manufacturer and a price of an automobile sold by the manufacturer and described in the document. The virtual taxonomy 300 includes a root node 310, which may relate, for example, to automobiles. The root node 310 includes three child nodes 320, 330, 340 which correspond to the respective automobile manufacturers. On the following level, child nodes 350, 360, 370 of the manufacturer nodes 320, 330, 340 are arranged which relate to the pricing of the respective automobiles.

The virtual taxonomy 300 may be defined on the application programming interface (API) level via an XML file that specifies one or more indexes containing the documents as well as the properties used to structure the documents. For the example above only the properties “Company” and “Price” were defined. For “Company” it was specified that it should be used as the first listed attribute whereby all values of the documents in the index should be listed. For “Price” it was specified that it should be used as the second listed attribute whereby price ranges should be determined.

The structure of the taxonomy may be computed on the fly during navigating through the virtual taxonomy 300. Therefore, the structure of the virtual taxonomy 300 is always adapted to a current document set. If, for example, documents of a further company are added to one of the identified indexes, these documents are immediately visible.

In some variations, the order of the taxonomy levels is pre-defined. For example, FIG. 4 illustrates XML code 400 in which a fixed order taxonomy is defined. With this arrangement, a “VIR_DEFINITION” part may specify one or more of the following:

- a name of the taxonomy (e.g., “demo001”);
- a type of the taxonomy (e.g., “guidedNav” which refers to guided navigation);
- a maximum number of folder documents “maxNumberOfFolderDocs” to be displayed (i.e. if the number of documents under a taxonomy node is below that border, no subfolders but the documents itself are presented);
- a “docSeparationNumber” that requires a taxonomy to subdivide documents into subfolders of about the specified number of documents (this happens only for folders, where the documents should be presented, e.g. on the lowest level of a fixed order taxonomy. The documents are divided into the subfolders according to their display name which can be useful if there are folders with large numbers of documents residing therein);
- a number of levels for which the order in the taxonomy is predefined (for a fixed order VT this number should be according to the number of property and query levels (explained below), which defines the depth of the virtual taxonomy); and
- a separation folder name “separationFolderName”, which is only necessary if a “docSeparationNumber” is defined which provides a name to be used as a prefix for separation folders.

The next part of the XML code 400 is a list of indexes, which specifies the documents used in the virtual taxonomy. By including multiple indexes a single taxonomy containing documents from all of these indexes may be specified. Thereafter, the XML code 400 specifies the different levels (e.g., category levels) of the virtual taxonomies. The order of these definitions determines the order of the levels in the taxonomy. Every level may be either an attribute or query level.

An attribute level may use the tag “VIR_ATTR”. It may defines taxonomy level for a property using one or more of the following settings:

- namespace: Namespace of a modeled property;
- name: Name of the property;
- type: In the example there are two different values used for this attribute. “proposeRanges” specifies that ranges are determined for the property and subfolders are provided according to these ranges. “allValues” means, that a subfolder for each value is presented; and
- displayName: Used in the display name of the folders of that taxonomy level. The rest of the displayname is determined by the value or range defined by that folder. If displayName is not defined, the name of the property is used. In no name should be used in front of the values displayName=“ ” can be used.

A query level may be defined by a set of queries. Each query may define a subnode containing only those child nodes fulfilling the query. A query level may be specified via the tag “VIR_QUERY” with a name. Such a query level may contain a list of “VIR_QUERY_RID”s each specifying a node for that level via one or more of the following:

- a name which is used as the display name for the folder; and
- a RID which specifies a record identification for a node in a query based taxonomy with a query used as the query for that node.

FIG. 5 illustrates a first level 500 of a taxonomy with a root node Taxonomies 510 and a plurality of categorized folders corresponding to child nodes of the root node including a folder (or other graphical user interface element) labeled Virtual Taxonomies 520. If the Virtual Taxonomies folder 520 is activated, a new level 600 of the taxonomy as provided in FIG. 6 may be displayed with a breadcrumb header 610 which identifies the root node of Taxonomies and the selected child node Virtual Taxonomies. This taxonomy level 600 displays at least a portion of categorized folders that are only child nodes to the Virtual Taxonomy node 520 including a demo001 folder 620.

If the demo001 folder 620 is selected, a further level 700 of the taxonomy as illustrated in FIG. 7 may be displayed. This taxonomy level 700 also includes a breadcrumb header 710 which additionally includes the demo001 folder node. The folders 720 displayed at this level of taxonomy 700 may be built by separating the documents with respect to an attribute such as the "last modified" date. For such an attribute, ranges may be determined as defined by "proposeRanges". For date properties, the documents may be separated into any predefined granularities such as years, quarter, months, days, and the like. For other properties a start and end value may be provided. The "displayName" specified in the XML may be presented before the values. For every folder 720, the number of documents below that folder (i.e., fulfilling the restrictions of the folder) may be presented. In FIG. 7, Modified: 2001 folder 730 indicates that 5919 documents were modified in the year 2001.

If the Modified: 2001 folder 730 is selected, a query level "Countries" a further level 800 of the taxonomy is presented as illustrated in FIG. 8. This level 800 includes a breadcrumb header 810 that includes all of the traversed levels with Taxonomies as the senior folder and Modified: 2001 as the junior folder. In this case, the illustrated queries are content queries using the terms "France", "Germany" and "Spain" (however, it will be appreciated that any kind of query may be specified) which are illustrated in their respective folders 820, 830, 840. The folder 830 with the label Spain shows that only 51 documents modified in 2001 contain the term "Spain".

Figure 10:
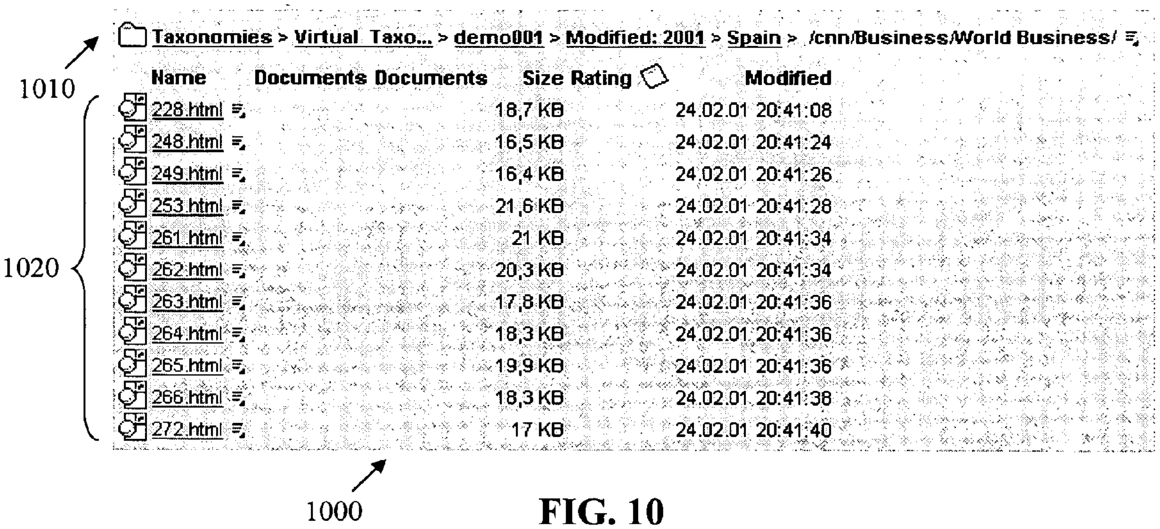
FIG. 10 illustrates a sixth level of the taxonomy of FIG. 5.

If the Spain folder 830 is selected, the next subsequent (and last) level 900 of the taxonomy is expanded as illustrated in FIG. 9 (which also includes a modified breadcrumb header 910). If any of the folders 920 within this level are selected, links to documents 1020 in such folder 910 are shown (as compared to another level of folders) as illustrated in level 1000 of FIG. 10 (which also contains a revised breadcrumb header 1010).

Figure 11:
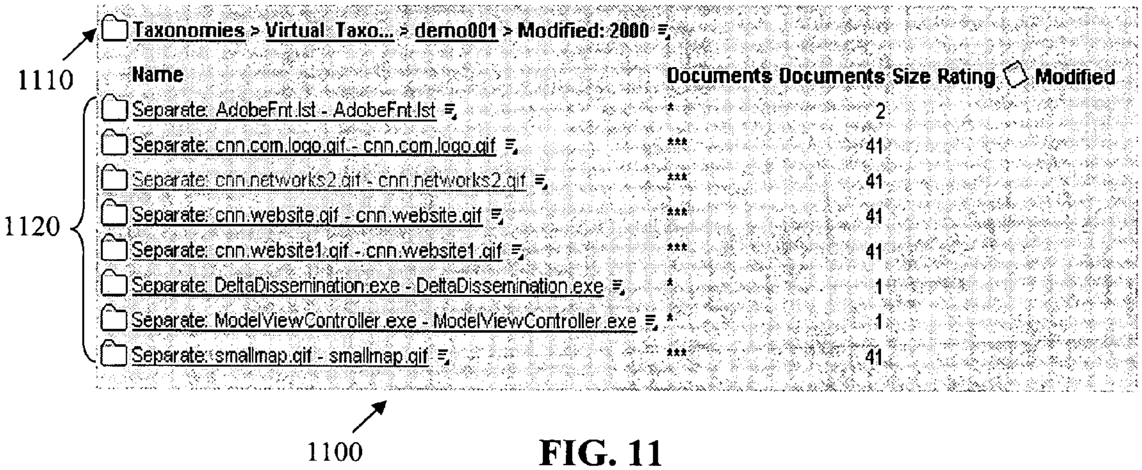
FIG. 11 illustrates a seventh level of the taxonomy of FIG. 5.

Returning to the level 700 illustrated in FIG. 7, if the Modified: 2000 folder 740 is selected, and if there are no documents fulfilling one of the queries on the next level, links 1120 to the corresponding documents are immediately presented as illustrated in level 1100 of FIG. 11 (which includes a corresponding breadcrumb header 1110). With this arrangement, because a "documentSeparationNumber" has been specified, the document links 1120 are automatically subdivided into separation folders. If you select one these folders 1120, you will get the documents in it.

If the Modified: 2004 folder 750 is selected at level 700 in FIG. 7 is selected, links to the associated documents are immediately presented because their number is below a number specified in the "maxNumberOfFolderDocs" field.

In some variations, a full expansion virtual taxonomy may be utilized that does not define an order for the attribute and query levels in the taxonomy. With such an arrangement, each property or query may be selected to further navigate at any point in the taxonomy. The documents (e.g., links to documents) may presented when their number under a folder is below the value specified with "maxNumberOfFolderDocs".

FIG. 12 comprises XML code 1200 for a full expansion virtual taxonomy. In contrast to the XML code 500 illustrated in FIG. 5 relating to a fixed order taxonomy, no "fixedOrderLevels" are defined. That means that the defined property and query levels have no defined order and can be chosen on every level. Therefore, on the first level of this taxonomy folders for all specified property and query levels are presented (as illustrated in level 1300 in FIG. 13).

With reference to FIG. 13, all of the defined queries and properties may be displayed in the folders 1310. Navigation may advance into the "Topics" query level by selecting the Topics folder 1320. Once selected, as illustrated in level 1400 in FIG. 14, folders 1410 for different query RIDs may be displayed. Selection of the Test folder 1420 causes a new level 1500 as illustrated in FIG. 15 to be displayed with includes folders 1510 corresponding to the defined queries and properties.

In yet other variations, combinations of fixed order and full expansions taxonomies may be utilized. For example, the "fixedOrderLevels" attribute may specify by its number n that the first n property and query level definitions are used in fixed order. The remaining property and query definitions are used as in a full expansion taxonomy. XML code 1600 to generate such a combination taxonomy is illustrated in FIG. 16.

Figure 17:
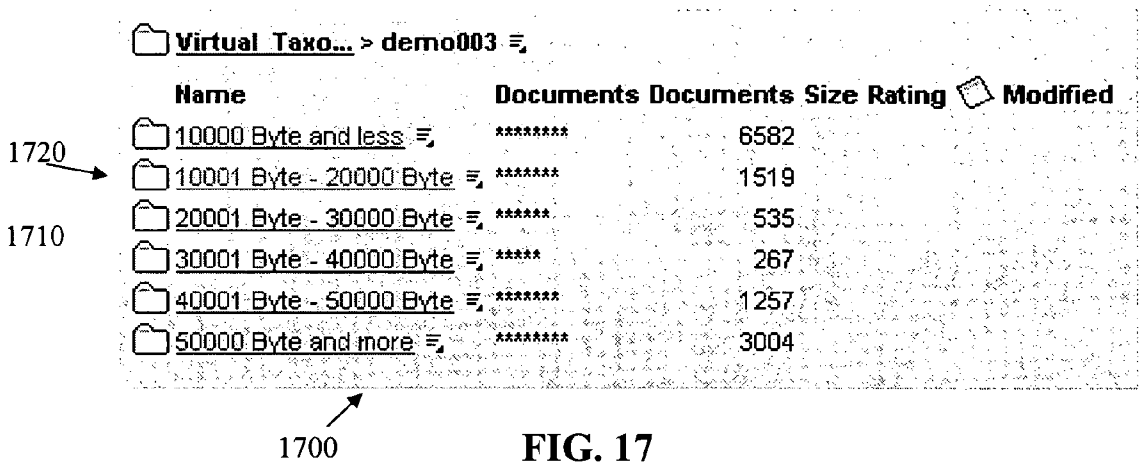
FIG. 17 illustrates a first level of a third taxonomy.
Figure 18:
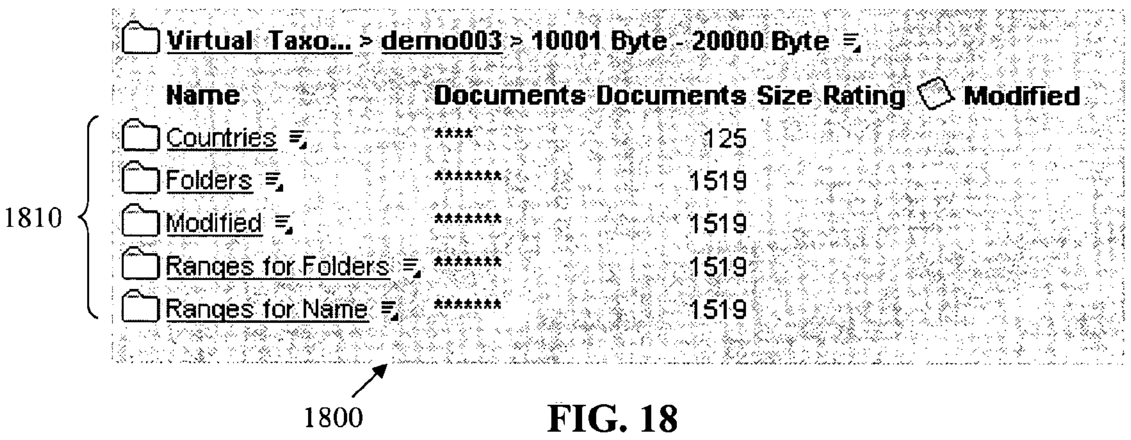
FIG. 18 illustrates a second level of the taxonomy of FIG. 17.

FIG. 17 illustrates a fixed order level 1700 that is defined by the query "size" in which the various folders 1710 are separated by intervals of 10,000 bytes. Navigating into the 10001 Byte-20,000 Byte folder 1720 will result in a full expansion level 1800 as illustrated in level 1800 of FIG. 18 which illustrates folders 1810 for any remaining attributes and queries.

Figure 19:
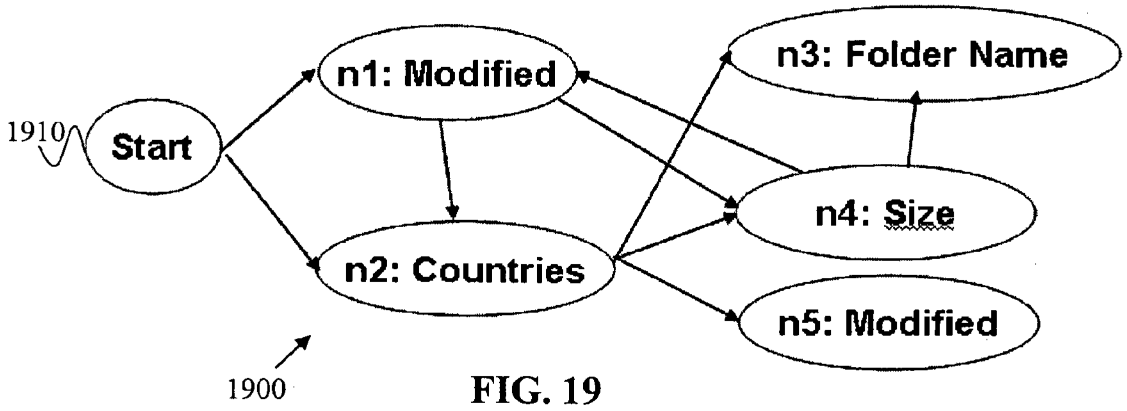
FIG. 19 illustrates a execution plan used for structuring a taxonomy.

An execution plan 1900 as illustrated in FIG. 19 may be utilized to define which attribute and query levels should be presented within a taxonomy. The execution plan 1900 may include a root node 1910 from which the various folder (category) nodes n1-n5 may be traversed as indicated by the interconnecting arrows. Sample XML code 2000 for implementing such a taxonomy is illustrated in FIG. 20.

The XML code 2000 provides that to enable a plan execution, "guidedNavStrategy" is set to "usePlan". A plan is defined by specifying a start node <VIR_START> with two successors. Each successor defines a node by its name. Every node is defined by its name and a level. The level x specifies the x-th defined attribute or query level starting with 0, e.g. node "n2" specifies the level 1, which means that is specifies the "Countries" query level.

Figure 22:
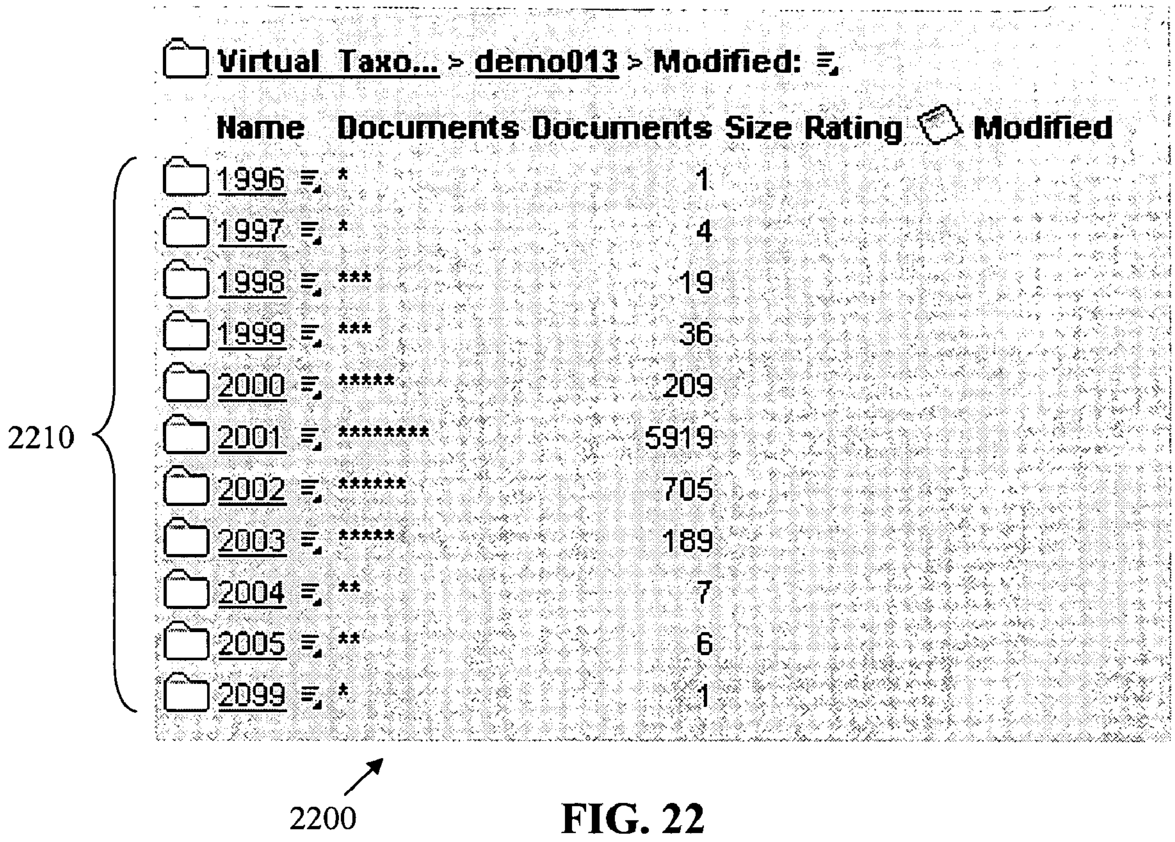
FIG. 22 illustrates a second level of the taxonomy of FIG. 21.
Figure 23:
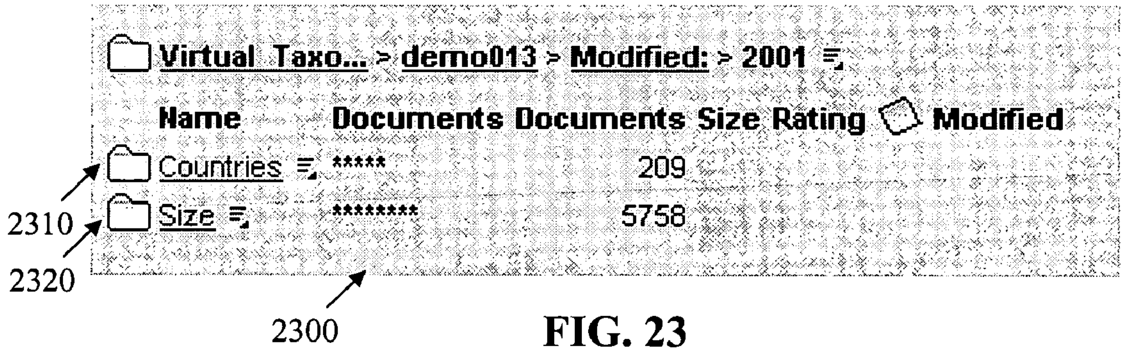
FIG. 23 illustrates a third level of the taxonomy of FIG. 21.

A first level 2100 of a taxonomy implementing the execution plan 1900 of FIG. 19 is illustrated in FIG. 21. At this level, folders corresponding to the two successors of the start node 1910, n1 and n2 are respectively presented as Countries folder 2110 and Modified folder 2120. Selection of the Modified folder 2120 will result in an additional level 2200 being displayed (as illustrated in FIG. 22) which includes folders 2210 with different ranges for that attribute (namely years). Selection of one of these folders 2210 will result in an additional level 2300 being displayed (as illustrated in FIG. 23) in which the successors of node n1, nodes n2 and n4, are respectively presented as a Countries folder 2310 and a Size folder 2320. Selection of Countries folder 2310 permits the traversal to any of nodes n3-n5, and selection of Size folder 2320 permits the traversal to either of nodes n1 and n4.

Variations may also be provided in which navigation through various folders of repositories that are used as data sources of the indexes which form the basis of the construction of a virtual taxonomy (with only folders fulfilling specified restrictions being presented). In addition, only folders and/or documents for which a user has access rights are shown. To implement this functionality, an entry "folderNameForIndexing" may be used and the corresponding type may be set to "useSeparator". Furthermore, an entry "separator" may be set to "/". XML code 2400 illustrating such properties is illustrated in FIG. 24 with the display name "Folders".

For example, after selecting "Folders" under the node "10001-20000 Byte", as illustrated in the breadcrumb navigation 2510 of the level 2500 in FIG. 25, a first folder level of the repositories of the documents in the indexes is presented that only includes documents fulfilling the restriction defined by the query of the node "10001-20000 Byte". If the cnn folder 2520 is selected, a new level 2600 as illustrated in FIG. 26 will be presented that includes a series of folders 2610 which allows for the navigation for all alternatives as demo0031 is a full expansion taxonomy.

If the Folders folder 2620 in FIG. 26 is selected, a second level 2700 as illustrated in FIG. 27 is displayed which includes a breadcrumb navigations 2710 and folders 2720 on a second level below the cnn folder 2520. It will be appreciated that a folder structure is only an example for dividing an attribute into a hierarchy. If would also be possible with other attributes with some separator, for example, Company—Project—Phase, which would be separated into three levels Company, Project and Phase, and the like.

Figure 28:
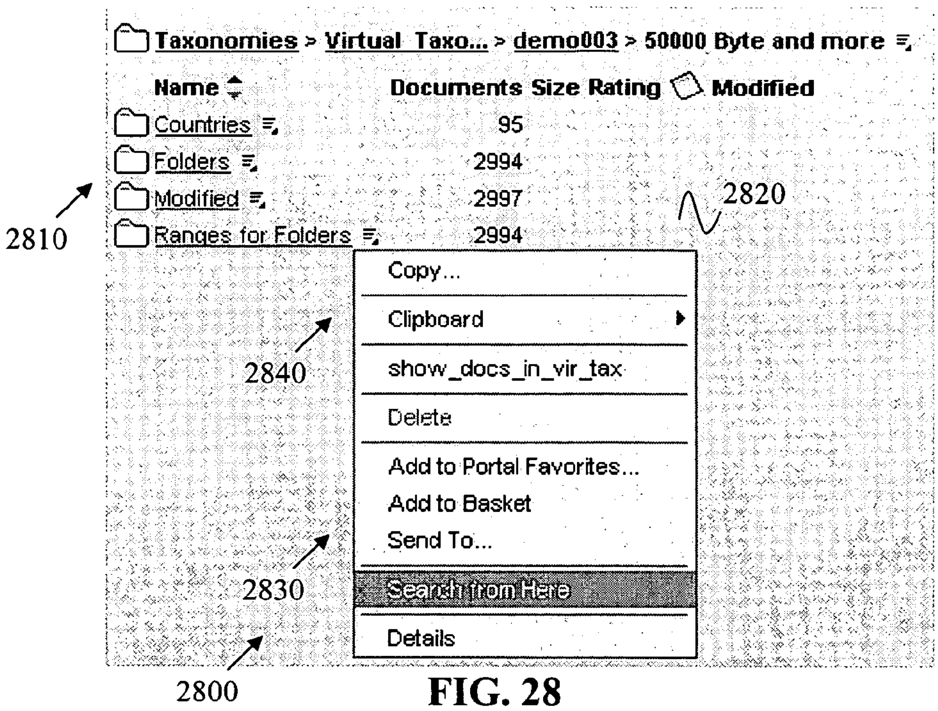
FIG. 28 illustrates a first level of a sixth taxonomy in which a search may be executed within any of the displayed folders.

Each node in the virtual taxonomy may be allow for a search to be executed within such node and its associated child nodes. For example, with reference to FIG. 28, a view 2800 is displayed in which a folder 2810 is activated by right clicking a mouse button which results in pop-up menu 2820 being displayed. Pop-up menu 2820 may include a menu item 2830 that causes one or more windows to be opened that allow for a search to be conducted from the selected node of the documents within that folder. Thereafter, only documents responsive the search query that fall under the selected node may be displayed (whether in a taxonomy or otherwise).

In addition, the pop-up menu 2820 may also include another menu item 2840 which, when activated, causes, all documents under a certain folder to be displayed. If a "docSeparationNumber" number is defined, the documents are subdivided into separation folders as explained above. Otherwise they are presented without separation folders.

Figure 29:
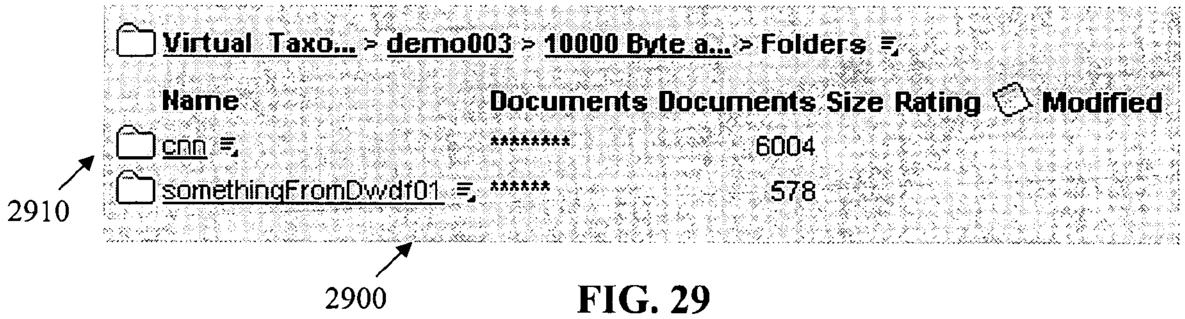
FIG. 29 illustrates a first level of a seventh taxonomy.

For a specified attribute used in a virtual taxonomy, it may be specified that further navigation is only executed with respect to that attribute by setting noIntermediateFolder="true". Such an arrangement may be used for attributes that are not used in a fixed order part of a virtual taxonomy. With reference to the view 2900 in FIG. 29, such a feature is used for the folder attribute providing a folder navigation without disturbing intermediate folders (although it will be appreciated that this feature may be used for all kinds of attributes). Selection of the cnn folder 2910 will result in the view 3000 in FIG. 30 which includes a plurality of folders 3010 which relate to the cnn category as well as a folder labelled Achim 3020 which was specified as forming part of the cnn category. Selection of a folder 3030 provides a view 3100 as illustrated in FIG. 31 which includes a plurality of folders 3110 as well as a partial list of responsive documents 3120 within those folders 3110.

In one alternative, the folder attribute may be used for navigating in the folder structure so that only the deepest folders (i.e., those folders farthest from a root node) are presented. With such a variation, any and all intermediate folders above without any documents therein are not shown. This arrangement can be defined by setting the "type" of the folder attribute on "useDeepestSeparator." It will be appreciated that the folder structure is only one example for dividing an attribute into a hierarchy and that other attributes may be utilized.

It will also be appreciated that after navigating a particular restriction, the order and maximum number of restrictions that will be offered for the next navigation may be predefined or otherwise determined based on previous traversals by a user. With such a variation, the user is not overburdened with a plethora of options for further restriction.

Query level definitions may also be utilized so that a starting folder in a query based taxonomy may be specified. If such a specified query level is selected for further navigation, the navigation proceeds as if the user started at the specified folder with all previously selected restrictions in the virtual taxonomy path.

FIG. 32 illustrates XML code 3200 for implementing such a "Walk In Taxonomy". The XML code 3200 defines a query level "Walk in Taxonomy" where the entry "workInQBT" is set to "true", which indicates that the specified RID is used as a starting point for a navigation in the query based taxonomy.

Figure 34:
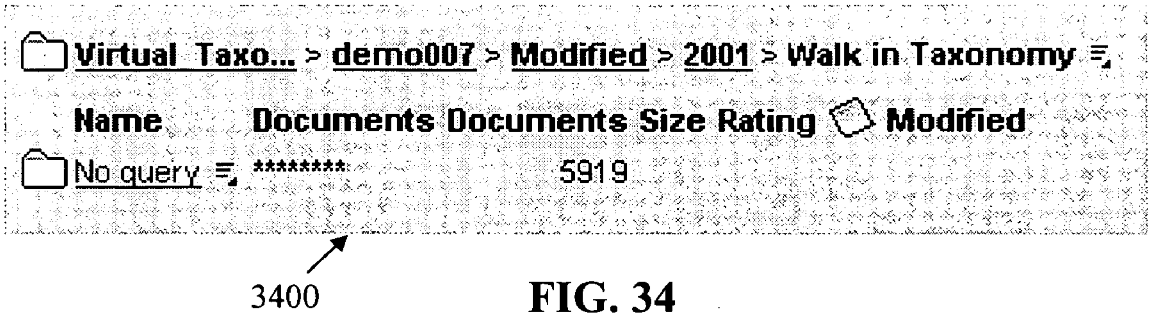
FIG. 34 illustrates a second level of the taxonomy of FIG. 33.
Figure 35:
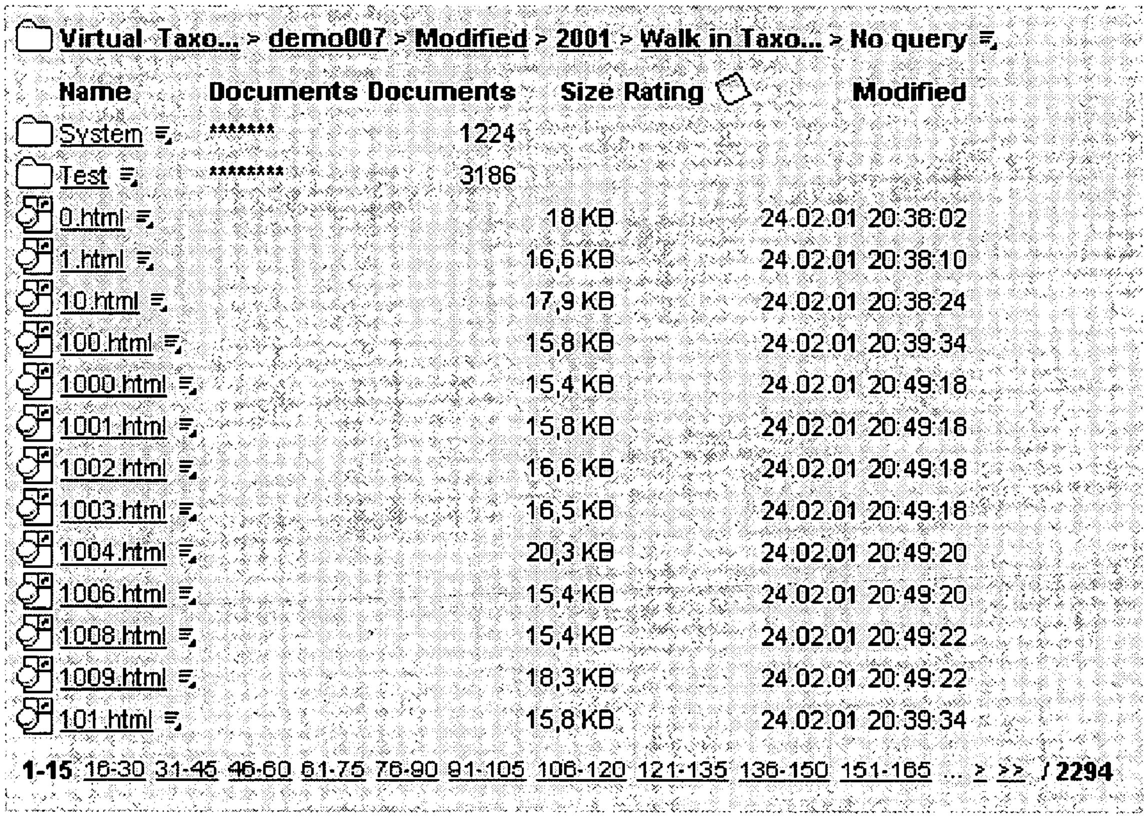
FIG. 35 illustrates a third level of the taxonomy of FIG. 33.

FIG. 33 illustrates a view 3300 in which a path has already been selected as indicated by the breadcrumb navigation 3310. If a Walk in Taxonomy folder 3320 is selected, further navigation may be performed done according to the structure of the defined query based taxonomy as illustrated in the view 3400 of FIG. 34, view 3500 of FIG. 35, and view 3600 of FIG. 36.

While folders are typically displayed in the user interface by their display name, other values may be displayed. For example, if a folder name is comprised of integers, alternative representations may be used in order to increase usability. With some virtual taxonomies, a sort property "virtualTaxSortString" may be configured as sort property to ensure a reasonable sorting of folders. Other translations of integer values and other alphanumeric representations may be used in sorting and labelling the folders.

As described above, every folder in a virtual taxonomy may include a corresponding number identifying an amount of documents within such folder. In some variations, these numbers are omitted (which may be for certain levels or folders or for an entire virtual taxonomy). In addition, other information may be included under a column marked Documents, such as in FIG. 7, in which a number of stars correlate to a number of documents contained therein.

In some views, values or ranges associated with displayed folders may omit units. However, as illustrated in XML code 3700 of FIG. 37, units of measurement may be defined by modifying the entry "displayNameSuffix" of the property "contentlength" to a identifier such as "bytes".

Ranges which are used to determine a number of folders within a certain view may be defined in a variety of ways. Sample techniques for determining the number of folders include:

- equidistance—the difference between to upper and lower borders are equal, for properties indexed as integers;
- equidistribution—the number of documents in the ranges are nearly equal, for properties indexed as strings; and
- time intervals—documents may be arranged according to time years, months and days for properties indexed as dates.

An optimal number of ranges may be set by setting an entry "optimalRangeNumber". In some variations, ten ranges are specified as an optimal number and so approximately ten ranges are provided whenever there are a sufficient number of responsive documents. In addition, for integer properties, an alternative range strategy "equidistance" may be implemented by setting the entry "distributionAlgm" on the value "equidistance".

When ranges are specified for integers, range borders may also be specified in order to avoid arbitrary ranges (e.g., 1 to 10,000 bytes vs. 35,684 to 45,683 byes, etc.). XML code 3800 illustrated in FIG. 38 illustrates an arrangement in which border ranges may be specifically defined. In the XML code 3800, for the property level with display name "Content Length 10000:", the entry "distributionAlgm" is set to "ranges" indicating that ranges should be defined. This definition is accomplished with the entry "rangeDefinition" which is set to "10[interval=10000,start=0,end=100000], 11[interval=1000,start=0,end=100000]". However, such an arrangement requires advance information regarding possible integer values of responsive documents.

Figure 40:
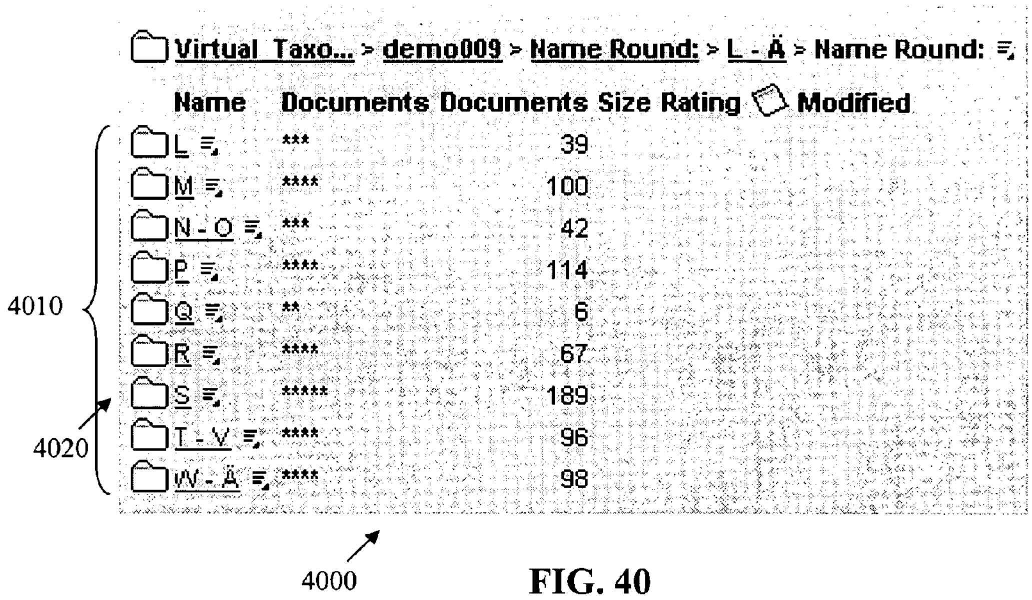
FIG. 40 illustrates a second level of the taxonomy of FIG. 39.
Figure 41:
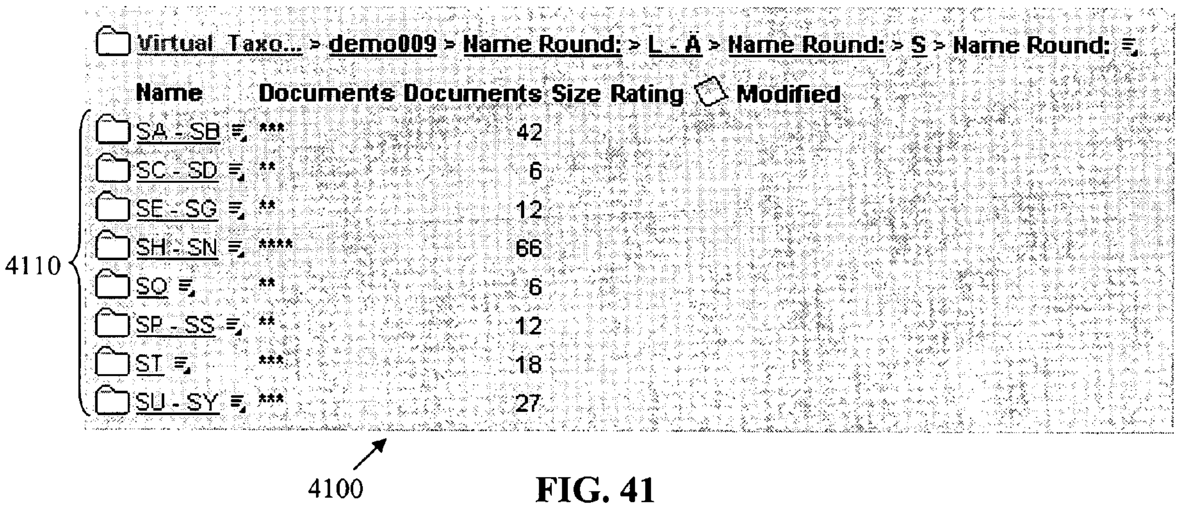
FIG. 41 illustrates a third level of the taxonomy of FIG. 39.

Sounds ranges may also be determined for strings as provided above for a property layer with display name "Name Round:". Therefore, an entry "distributionAlgm" is set to "round". FIG. 39 illustrates a view 3900 in which ranges for folders 3910 are based on both integer and alphabetical indicators including a folder 3920 for the range L-A. FIG. 40 illustrates a view 4000 that is displayed in response to the selection of the folder 3920 for the range L-A which includes folders 4010 that are based on alphabetical indicators within the designated range with one folder 4020 that is a folder for documents beginning with the word S. Selection of the "5" folder 4020 results in the view 4100 as illustrated in FIG. 41 with folders 4110 being displayed.

Ranges may also be defined with gaps for integer properties with a display name "Content Length Separate:". With this arrangement an entry "distributionAlgm" may be set to "separateRanges" and the entry "rangeDefinition" may be set to:

"10[value1=0,value2=5000,operator=BT],10 [value1=6000,value2=10000, operator=BT], 11[value1=1000,value2=2000,operator=BT],11 [value1=3000,value2=5000, operator=BT]".

FIG. 42 illustrates a view 4200 that includes a 0-5000 bytes folder 4210 and a 6000-10000 bytes folder 4220 (which includes a non-continuous range separated by a 1000 byte gap from the 0-5000 bytes folder 4210). Selection of the 0-5000 bytes folder 4210 results in a view 4300 as illustrated in FIG. 43 that includes a first folder 4310 that includes a range separated by a gap (e.g., 1000 bytes) from a second folder 4320.

Gaps may also be implemented for string properties as shown for a property layer with display name "Name Ranges: ". For string properties, the following "rangeDefinition" may be used:

"10[value 1=a,value2=k,operator=BT],10[value1=m, value2=z,operator=BT]"

However, one problem with string properties is that, for example, for the range "a-k" all document which have a property value between "a" and "k" are in that range. Unfortunately documents with value "ka" are not in that range. To include all values starting with "k", the range definition may use a special character �, which is the last Unicode character as:

"10[value1=a,value2=k�,operator=BT],10 [value1=m,value2=z�,operator=BT]"

Figure 45:
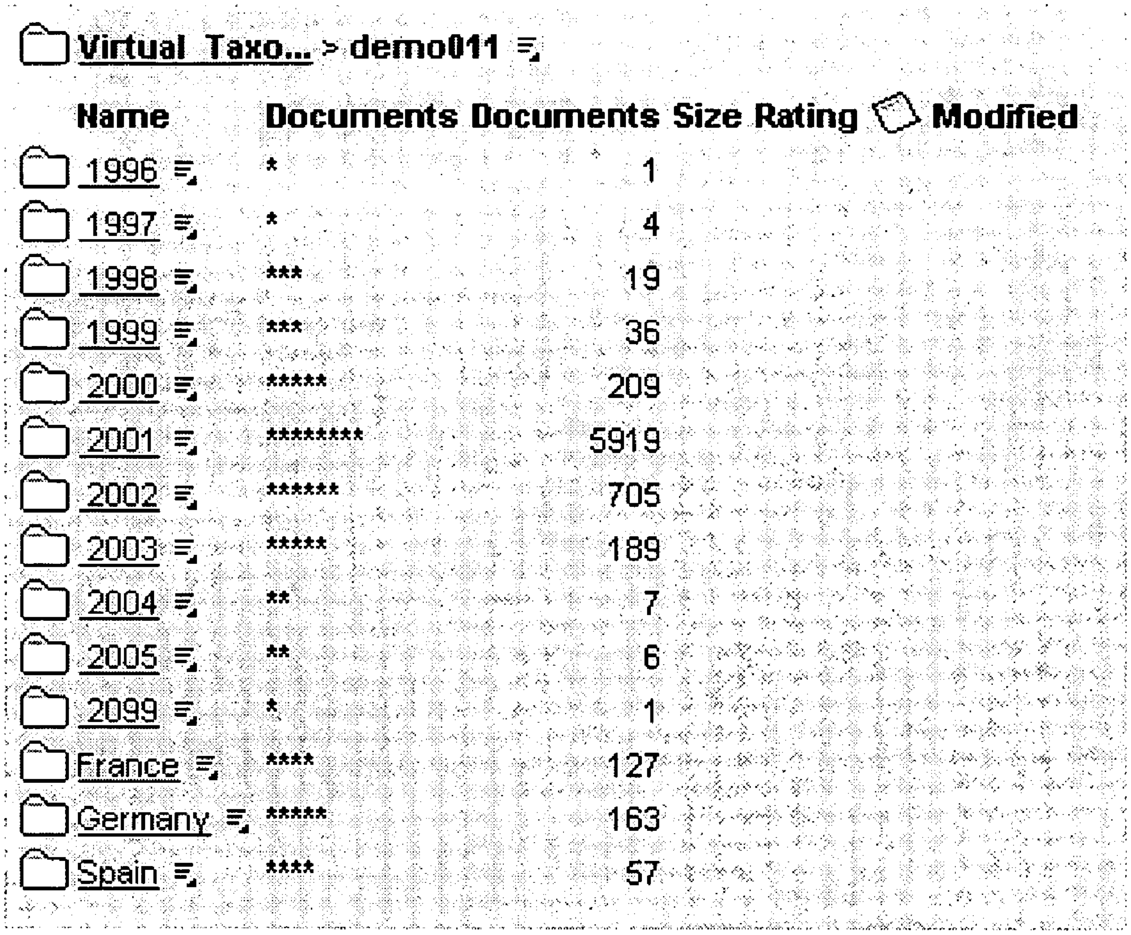
FIG. 45 illustrates a level of a eleventh taxonomy generated according to the XML code of FIG. 44.

In some views, intermediate folder may be bypassed so that only the "deepest" folders containing documents are displayed. XML code 4400 in FIG. 44 illustrates an arrangement by which intermediate levels may be skipped by defining an entry "noIntermediateFolder" and as "true". Navigation into a taxonomy generated using the XML code 4400 may appear as in the view 4500 in FIG. 45. As a further example, if a user navigates down to "modified in 2001", and all documents were modified in June 2001, then individual days in June may be displayed as restrictions. Similar arrangements may be provided for numerical or alphanumeric ranges.

Figure 46:
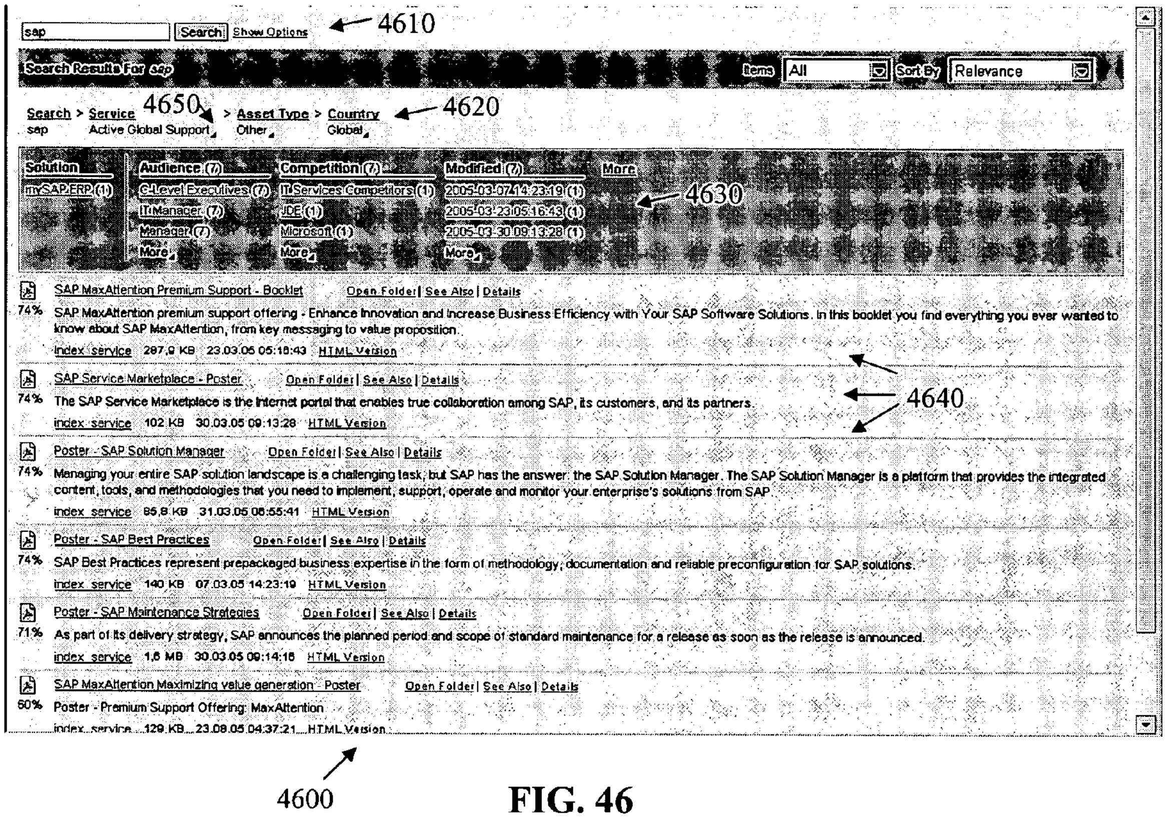
FIG. 46 illustrates a view including a breadcrumb navigation indicator.
Figure 47:
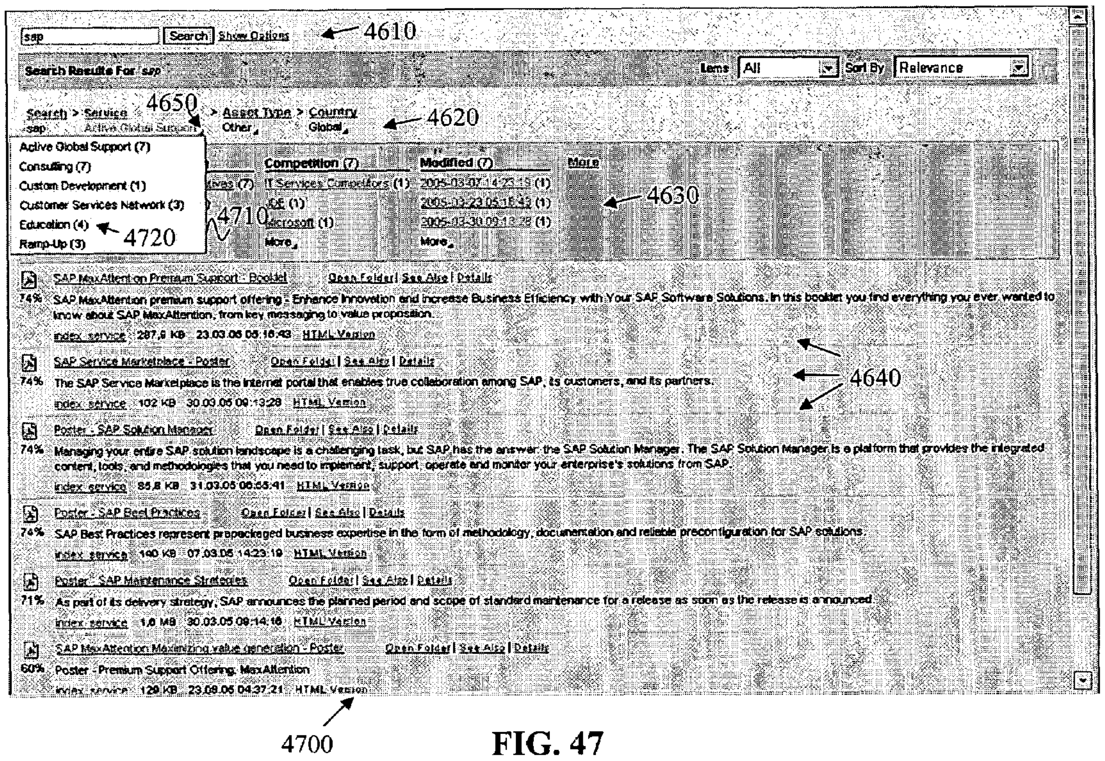
FIG. 47 illustrates a view including an activation of a graphical user interface element associated with the breadcrumb navigation indicator of FIG. 46.

FIGS. 46 and 47 respectively show views 4600, 4700 in which a key word search query was entered into a query box 4610. After the search query was conducted, various categories containing responsive documents were traversed (e.g., Active Global Support→Other→Global) which form a breadcrumb 4620. Additionally, numerous additional attributes and a number of associated responsive documents 4630 may also be displayed to offer a user additional restrictions to the restrictions identified in the breadcrumb 4620. Moreover, several brief descriptions regarding documents 4640 may be displayed which fall within the category Global. It will also be appreciated that the breadcrumb may solely relate to key word search queries or traversal through various restrictions.

The categories in the breadcrumb 4620 may include a graphical user interface element 4650, which, when activated, causes a menu 4710 to be displayed. This menu 4710 may list additional attributes. These attributes may be for documents containing each restriction prior to the graphical user interface element 4650 (e.g., sap), the identified attribute (e.g., Active Global Support, Consulting, Custom Development, Customer Services Network, Education, Ramp-Up), and each restriction subsequent to the graphical user interface element 4650 (e.g., Other, Global). In some variations, the attributes are ranked according to factors such as: number of responsive documents containing the displayed attributes, most recently accessed documents containing the displayed attributes, most frequently accessed documents containing the displayed attributes, alphabetical order, and the like. Optionally, a number of responsive documents associated with each attribute in the menu 4720 may also be displayed. Selection of a category Education 4720 will result in a revised breadcrumb 4620 Education→Other→Global Support.

It will be appreciated that the variations for presenting documents within a virtual taxonomy also apply to a presentation of a breadcrumb. For example, if a user applies a traversal (i.e., a pivot) in the middle of a breadcrumb 2001>June>$10^{th}$, and the first restriction in the breadcrumb is changed to 2002, and there are no documents responsive to the restrictions 2002>June>10th, then, for example, the user may be presented with documents for just 2002>June. If there are no responsive documents in 2002>June, then the user may be presented with documents from 2002.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer program product, tangibly embodied on computer-readable storage media, the computer program product being operable to cause a data processing apparatus to:

display a breadcrumb identifying a sequence of at least two restrictions of a plurality of documents, the breadcrumb having graphical user interface elements horizontally arranged that each respectively correspond to one of the restrictions, at least one of the graphical user interface elements comprising a graphical selectable indicia;

receive a selection of one of the graphical selectable indicia corresponding to an intermediate restriction that is prior to the last restriction in the sequence; and display, concurrently with the breadcrumb and in response to the selection, at least one attribute and a numeric indication of a number of the documents responsive to both of (i) each restriction prior to the intermediate restriction that contain the attribute, and (ii) each restriction in the sequence subsequent to the intermediate restriction that contain the attribute, wherein selection of an attribute graphical user interface element associated with one attribute causes the displayed breadcrumb to be replaced with a modified breadcrumb in which the intermediate restriction is replaced with the attribute corresponding to the selected attribute graphical user interface element, the at least one attribute being different than the intermediate restriction.

2. A computer program product as in claim 1, wherein the computer program product is further operable to cause a data processing apparatus to:

receive a selection of the graphical user interface element associated with one attribute; and generate and display the modified breadcrumb that includes the selected attribute in the sequence in place of the intermediate restriction.

3. A computer program product as in claim 1, wherein the computer program product is further operable to cause a data processing apparatus to:

receive a selection of the graphical user interface element associated with one attribute; and display at least one document responsive to the selected attribute and each restriction prior and subsequent to the intermediate restriction.

4. A computer program product as in claim 1, wherein the documents form hierarchical nodes of a virtual taxonomy in which the documents are arranged according to their respective one or more associated attributes.

5. A computer program product as in claim 4, wherein there are a plurality of attributes are displayed in response to the selection of the breadcrumb graphical user interface element associated with the selected one of the restrictions having at least one subsequent restriction in the sequence.

6. A computer program product as in claim 5, wherein a list of the displayed attributes is fixed.

7. A computer program product as in claim 5, wherein only attributes having at least one document responsive to the selected at least one attribute and each restriction prior and subsequent to the intermediate restriction are displayed.

8. A computer program product as in claim 7, wherein the attributes are displayed in a ranked order.

9. A computer program product as in claim 8, wherein the ranked order is based on a factor chosen from a group comprising: number of responsive documents containing the displayed attributes, most recently accessed documents containing the displayed attributes, most frequently accessed documents containing the displayed attributes, and alphabetical order.

10. A computer program product as in claim 1, wherein the computer program product is further operable to cause a data processing apparatus to:

determine whether a user has permission to access documents responsive to the at least one attribute and each restriction prior and subsequent to the selected restriction; and limit access to only those documents in which the user has permission to access.

11. A computer program product as in claim 10, wherein the at least one attribute is limited to attributes in which there are responsive documents that the user has permission to access.

12. A computer program product as in claim 1, wherein there are a plurality of attributes, and wherein the attributes are pairwise disjoint.

13. A computer program product as in claim 1, wherein there are a plurality of attributes, each containing a substantially identical number of responsive documents.

14. A computer program product as in claim 13, wherein the plurality of attributes are based on integer identifications associated with the responsive documents.

15. A computer program product as in claim 1, wherein there are a plurality of attributes which are separated by a pre-determined fixed interval.

16. A computer program product as in claim 1, where in at least one of the restrictions is based on a key word search query.

17. A computer program product as in claim 1, where in at least one of the restrictions is based on navigation through a virtual taxonomy.

18. A computer program product as in claim 1, wherein the breadcrumb identifies a number of responsive documents associated with each restriction.

19. A computer program product, tangibly embodied on computer-readable storage media, the computer program product being operable to cause a data processing apparatus to:

display a first subset of categories of a plurality of documents responsive to a search query and limited by at least one restriction in a breadcrumb navigational arrangement, each document having one or more associated attributes, the categories forming hierarchical nodes of a virtual taxonomy in which the plurality of documents are arranged according to their respective one or more associated attributes, the categories in the first subset having corresponding graphical user interface elements, at least one of the graphical user interface elements comprising a graphical selectable indicia;

receive a selection of a graphical selectable indicia corresponding to one of the categories in the first subset; and display, simultaneous to the breadcrumb navigational arrangement and in response to the received selection, a menu characterizing a second subset of categories of a plurality of documents responsive to the search query, the second subset comprising one or more categories residing on (i) at least one of a sister node to a node associated with the selected category, and (ii) a node descending therefrom, wherein selection of one of the categories in the second subset of categories causes a modified breadcrumb navigational arrangement to be displayed in which the selected category in the first subset is replaced by the selected category in the second subset, the categories in the second subset being different from that of the category selected in the first subset.

20. A computer-implemented method comprising:

displaying a breadcrumb identifying a sequence of at least two restrictions of a plurality of documents, the breadcrumb displaying the at least two restrictions, the breadcrumb having graphical user interface elements horizontally arranged that each respectively correspond to one of the restrictions, at least one of the graphical user interface elements comprising a graphical selectable indicia;

receiving a selection of one of the graphical selectable indicia corresponding to an intermediate restriction that is prior to the last restriction in the sequence; and displaying, simultaneous to the breadcrumb and in response to the selection, a plurality of attributes and a numeric indication of a number of the documents responsive to each restriction prior to the selected restriction that contain the corresponding attribute and each restriction in the sequence subsequent to the selected restriction, wherein selection of one of the plurality of attributes causes a modified breadcrumb to be displayed in which the intermediate restriction is replaced by the selected attribute, the plurality of attributes differing from the intermediate restriction.

* * * * *